(12) United States Patent
Shimizu

(10) Patent No.: US 11,668,459 B2
(45) Date of Patent: *Jun. 6, 2023

(54) LIGHTING DEVICE AND DISPLAY DEVICE

(71) Applicant: SATURN LICENSING LLC, New York, NY (US)

(72) Inventor: Takaharu Shimizu, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,206

(22) Filed: May 3, 2022

(65) Prior Publication Data

US 2022/0260247 A1 Aug. 18, 2022

Related U.S. Application Data

(63) Continuation of application No. 17/266,843, filed as application No. PCT/JP2019/023958 on Jun. 17, 2019, now Pat. No. 11,359,805.

(30) Foreign Application Priority Data

Aug. 22, 2018 (JP) .................................. 2018155767

(51) Int. Cl.
*F21V 33/00* (2006.01)
*F21V 23/00* (2015.01)

(52) U.S. Cl.
CPC ........ *F21V 33/0052* (2013.01); *F21V 23/002* (2013.01)

(58) Field of Classification Search
CPC ............................ F21V 33/0052; F21V 23/002
See application file for complete search history.

(56) References Cited

U.S. PATENT DOCUMENTS 10,184,638 B2  1/2019  Chai
2011/0075443 A1  3/2011  Huang et al.

FOREIGN PATENT DOCUMENTS

| JP | 2003323927 | 11/2003 |
|---|---|---|
| JP | 2007305742 | 11/2007 |
| JP | 2013229232 | 11/2013 |
| JP | 2018507517 | 3/2018 |
| JP | 2018098112 | 6/2018 |
| KR | 101490307 | 2/2015 |
| WO | 2016148087 | 9/2016 |

OTHER PUBLICATIONS

International Search Report for Application No. PCT/JP2019/023958 dated Aug. 13, 2019, 2 pages —*—cited in parent application.

*Primary Examiner* — Thomas M Sember
(74) *Attorney, Agent, or Firm* — Richard LaPeruta

(57) ABSTRACT

A plurality of light source boards each having a wiring pattern including a plurality of wires, a plurality of light-emitting elements disposed on each light source board, switching on and off of which being controlled by a control board, board-side connectors each attached to a corresponding one of the plurality of light source boards, a flexible flat cable that has a multi-core structure including a flat-shaped insulator and a plurality of conductors aligned in a direction orthogonal to a thickness direction of the insulator, and is connected at one end to the control board, and a plurality of cable-side connectors attached to the flexible flat cable and coupled to the board-side connectors are included.

20 Claims, 25 Drawing Sheets

FIG. 9
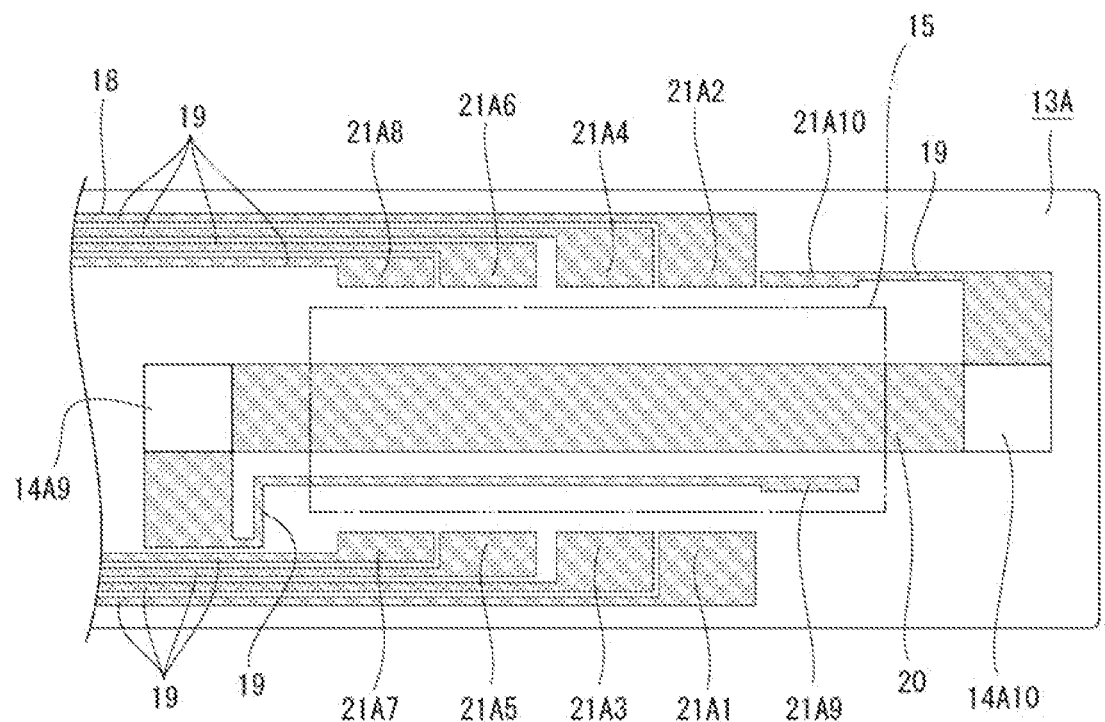
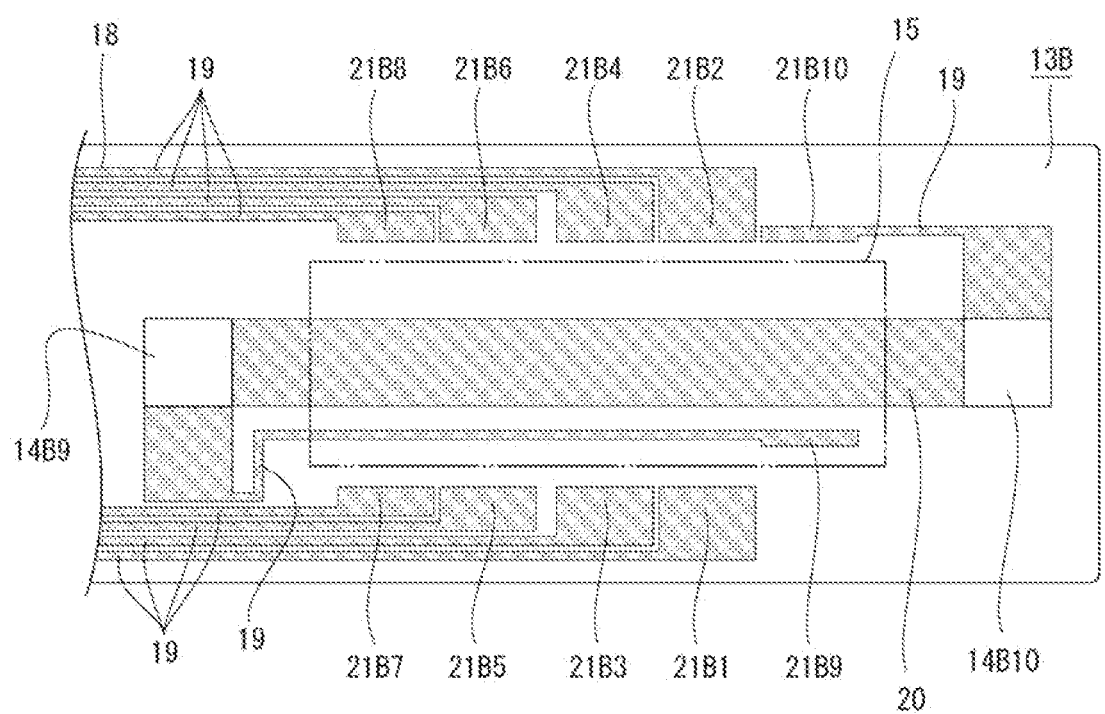

LIGHTING DEVICE AND DISPLAY DEVICE

TECHNICAL FIELD

The present technology relates to a technical field of a lighting device in which switching on and off of light-emitting elements disposed on light source boards is controlled by a control board and a display device including the lighting device.

BACKGROUND ART

There is a lighting device that includes a plurality of light source boards each having a wiring pattern formed by a plurality of wires and a plurality of light-emitting elements disposed on each light source board and controlled by a control board to be switched on and off (for example, see Patent Document 1).

Such a lighting device is provided, for example, in a display device of a television receiver, a personal computer, or the like. The display device is provided with a display having a display surface on which images are displayed and a back chassis disposed on the back side of the display. The lighting device is disposed, for example, between the display and the back chassis as a backlight.

In a lighting device described in Patent Document 1, a plurality of horizontally long light source boards and a control board that controls switching on and off of light-emitting elements are connected via a relay board. The relay board is connected to the individual light source boards via a plurality of connectors.

By the way, when light is emitted from the light-emitting elements in the lighting device as described above, the light-emitting elements and the light source boards generate heat, and the light source boards and others expand or contract due to temperature changes, which may cause misalignment between the light source boards and the relay board, preventing good connections between the light source boards and the relay board from being ensured.

Therefore, in the lighting device described in Patent Document 1, the connectors are provided with misalignment allowance means for allowing misalignment between the light source boards and the relay board. The misalignment allowance means absorb misalignment between the light source boards and the relay board, ensuring good connections between the light source boards and the relay board and good connections between the light source boards and the control board via the relay board.

CITATION LIST

Patent Document

Patent Document 1: Japanese Patent Application Laid-Open No. 2018-98112

SUMMARY OF THE INVENTION

Problems to be Solved by the Invention

However, the lighting device described in Patent Document 1 may have increased manufacturing cost for the provision of the misalignment allowance means to the connectors in addition to the provision of the relay board to connect the plurality of light source boards and the control board.

Furthermore, to make the allowance of the misalignment allowance means provided to the connectors sufficient for the expansion or contraction of the light source boards and others due to temperature changes, it is necessary to increase the size of the connectors. In this case, the reduction of the manufacturing cost may be hindered and the sizes of the lighting device and the display device may be increased.

Therefore, it is an object of a lighting device and a display device of the present technology to ensure good connections between light source boards and a control board without causing a rise in manufacturing cost.

Solutions to Problems

First, a lighting device according to the present technology includes a plurality of light source boards each having a wiring pattern including a plurality of wires, a plurality of light-emitting elements disposed on each light source board, switching on and off of which being controlled by a control board, board-side connectors each attached to a corresponding one of the plurality of light source boards, a flexible flat cable that has a multi-core structure including a flat-shaped insulator and a plurality of conductors aligned in a direction orthogonal to a thickness direction of the insulator, and is connected at one end to the control board, and a plurality of cable-side connectors attached to the flexible flat cable and coupled to the board-side connectors, in which some conductors of the plurality of conductors are electrically connected to the wires at each of the plurality of light source boards via a corresponding one of the cable-side connectors and a corresponding one of the board-side connectors.

Thus, some conductors of the plurality of conductors in the flexible flat cable connected to the control board are electrically connected to the wires at each light source board via the cable-side connector and the board-side connector.

Second, in the lighting device according to the above-described present technology, it is desirable that the light source boards are each formed in a shape having a longitudinal direction, and are spaced in a direction orthogonal to the longitudinal direction, the light-emitting elements are spaced in the longitudinal direction of the light source boards, and the plurality of cable-side connectors is coupled to the board-side connectors each attached to the corresponding one of the plurality of light source boards.

Consequently, the plurality of light source boards and the flexible flat cable are disposed at right angles.

Third, in the lighting device according to the above-described present technology, it is desirable that at least two of the light-emitting elements disposed on different corresponding ones of the light source boards are connected in series via the board-side connectors, the cable-side connectors, and the flexible flat cable.

Consequently, the light-emitting elements disposed on the different corresponding light source boards are simultaneously switched on and off.

Fourth, in the lighting device according to the above-described present technology, it is desirable that each cable-side connector is provided with a plurality of connection terminals, connection holes for exposing some conductors of the plurality of conductors are formed in the insulator, and some connection terminals of the plurality of connection terminals are inserted into the connection holes to be connected to the conductors.

Thus, the connection terminals are inserted into the connection holes to be connected to the conductors, and some of the plurality of conductors are electrically connected to the wires.

Fifth, in the lighting device according to the above-described present technology, it is desirable that each cable-side connector is provided with a plurality of connection terminals each connected to a corresponding one of the plurality of conductors, and each board-side connector is provided with at least one electrode connected to some connection terminals of the plurality of connection terminals.

Consequently, connection between the conductors and the wires and insulation between the conductors and the wires are provided by the presence and absence of the electrodes for the connection terminals, so that the plurality of light source boards having the same wiring pattern can be used.

Sixth, in the lighting device according to the above-described present technology, it is desirable that the wiring patterns of the plurality of light source boards are different, and at least one of the wires of each of the light source boards having the different wiring patterns is connected to a different corresponding one of the conductors.

Consequently, due to the differences in the wiring patterns, the wires are connected to the different conductors to provide connection between the conductors and the wires and insulation between the conductors and the wires, so that it becomes possible to use the plurality of board-side connectors and cable-side connectors of the same structures, individually.

Seventh, in the lighting device according to the above-described present technology, it is desirable that the flexible flat cable includes a plurality of different-width portions that is formed in a staircase shape whose width changes in a longitudinal direction and becomes wider toward the control board in the longitudinal direction, each of the cable-side connectors is attached to a corresponding one of the plurality of different-width portions, and the numbers of the conductors in the different-width portions of larger widths are larger.

Consequently, the flexible flat cable and the plurality of light source boards are electrically connected via the cable-side connectors attached to the corresponding different-width portions of the different widths.

Eighth, in the lighting device according to the above-described present technology, it is desirable that each of the cable-side connectors of the same configuration is attached to the corresponding one of the plurality of different-width portions.

The flexible flat cable and the plurality of light source boards are electrically connected via the same cable-side connectors attached to the different-width portions of the different widths.

Ninth, a display device according to the above-described present technology includes a display that displays an image on a display surface, a back chassis disposed on a side opposite the display surface of the display, and a lighting device disposed between the display and the back chassis to function as a backlight, the lighting device including a plurality of light source boards each having a wiring pattern including a plurality of wires, a plurality of light-emitting elements disposed on each light source board, switching on and off of which being controlled by a control board, board-side connectors each attached to a corresponding one of the plurality of light source boards, a flexible flat cable that has a multi-core structure including a flat-shaped insulator and a plurality of conductors aligned in a direction orthogonal to a thickness direction of the insulator, and is connected at one end to the control board, and a plurality of cable-side connectors attached to the flexible flat cable and coupled to the board-side connectors, in which some conductors of the plurality of conductors are electrically connected to the wires at each of the plurality of light source boards via a corresponding one of the cable-side connectors and a corresponding one of the board-side connectors.

Thus, in the lighting device, some conductors of the plurality of conductors in the flexible flat cable connected to the control board are electrically connected to the wires at each light source board via the cable-side connector and the board-side connector.

Effects of the Invention

According to the present technology, since some conductors of the plurality of conductors in the flexible flat cable connected to the control board are electrically connected to the wires at each light source board via the cable-side connector and the board-side connector, the plurality of light source boards is connected to the control board via the flexible flat cable, allowing good connections between the light source boards and the control board to be ensured without causing a rise in manufacturing cost.

Note that the effects described in the present description are merely examples and non-limiting, and other effects may be included.

BRIEF DESCRIPTION OF DRAWINGS

FIG. 9 shows a first example of electrical connections in the lighting device together with FIGS. 10 to 14, and this figure is an enlarged front view showing part of the light source boards.

MODE FOR CARRYING OUT THE INVENTION

Hereinafter, a mode for implementing a lighting device and a display device of the present technology will be described with reference to the accompanying drawings.

In an embodiment described below, the display device of the present technology is applied to a television receiver that displays images on a display, and the lighting device of the present technology is applied to a lighting device provided in the television receiver.

Note that the scope of application of the present technology is not limited to television receivers and lighting devices provided in them. The present technology can be widely applied to various display devices such as monitors used in personal computers and the like and lighting devices provided in these various display devices.

In the following description, front-back, up-down, and left-right directions will be described with a direction in which a display surface of the display device (television receiver) faces as a forward direction. However, the front-back, up-down, and left-right directions described below are for convenience of explanation, and the implementation of the present technology is not limited to these directions.

<Configuration of Display Device>

The configuration of a display device (television receiver) 1 will be described below (see FIGS. 1 to 8).

Figure 1:
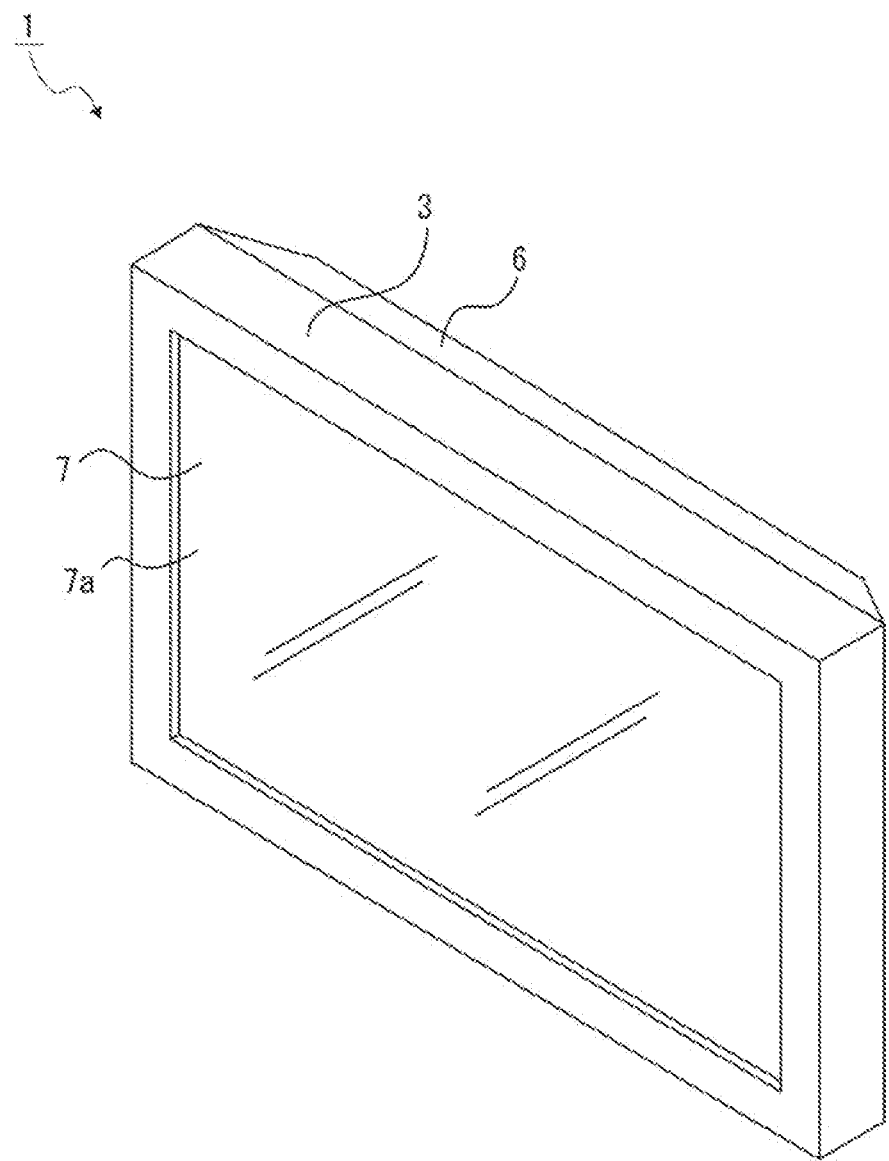
FIG. 1 shows an embodiment of a display device and a lighting device of the present technology together with FIGS. 2 to 25, and this figure is a perspective view of the display device.

The display device 1 is formed, for example, in a horizontally long and substantially rectangular shape with a thin thickness in the front-back direction (see FIG. 1). For example, the display device 1 is placed on a placement surface such as a desktop by a stand (not shown) or mounted on a wall by a bracket or the like (not shown) for use.

Figure 2:
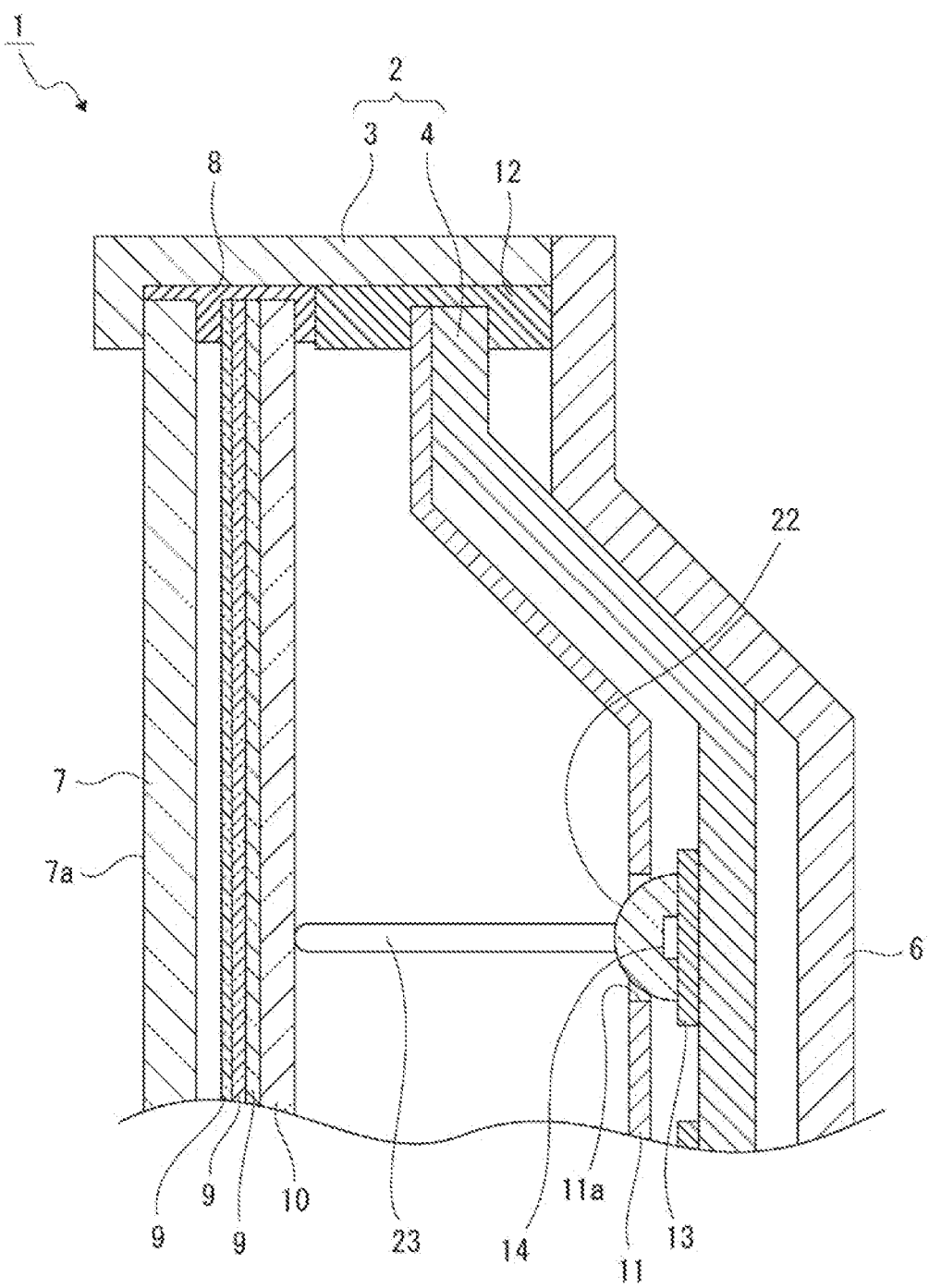
FIG. 2 is an enlarged cross-sectional view showing the display device with part thereof omitted.

The display device 1 has a casing 2 in which necessary components are disposed (see FIGS. 1 and 2). The casing 2 includes a bezel 3 located on the front side and a back chassis 4 located on the back side.

The bezel 3 is formed in a substantially rectangular frame shape.

The back chassis 4 is formed in a shallow box shape opened forward. A control board 5 is mounted, for example, on a central portion of the back surface of the back chassis 4. The control board 5 has, for example, a function of supplying current to a display described later and controlling switching on and off of light sources described later. Cable insertion holes (not shown) are formed in central portions of the back chassis 4.

A rear cover 6 is attached to the back chassis 4 from behind. The rear cover 6 is formed in a shallow box shape opened forward. The control board 5 is blocked by the rear cover 6.

A display 7 is disposed on the inner peripheral side of the bezel 3. The display 7 is, for example, a liquid crystal panel formed by a glass substrate, a polarizing sheet, and others stacked on top of each other, and its front surface is formed as a display surface 7a on which images are displayed.

The display 7 is formed in a substantially rectangular shape, and has a portion other than an outer peripheral portion provided as a display area on which images are displayed. A connection board (not shown) is provided at a lower edge portion of the display 7. The connection board is connected to the control board 5 mounted on the back surface of the back chassis 4. Thus, current is supplied from the control board 5 through the connection board to the display 7.

A frame-shaped holder 8 is disposed inside the bezel 3. The holder 8 holds the display 7, a plurality of optical sheets 9, 9, . . . , and a diffuser plate 10 in order from the front side.

The optical sheets 9, 9, . . . are disposed on the front side of the diffuser plate 10 in a laminated state. The optical sheets 9, 9, . . . have various functions such as a light diffusion function and control of light traveling direction. The optical sheets 9, 9, . . . provide uniformity in brightness, improvement in brightness, and so on in the display 7. The diffuser plate 10 has a function of diffusing light emitted from the light sources for the uniformity of brightness in the display 7.

A reflective sheet 11 is disposed between the diffuser plate 10 and the back chassis 4. Insertion holes 11a, 11a, . . . are formed in the reflective sheet 11, spaced up and down and left and right.

A frame-shaped bracket 12 is disposed inside the bezel 3. The bracket 12 is located on the back side of the holder 8. The reflective sheet 11 and the back chassis 4 are held by the bracket 12.

A lighting device 50 is disposed between the diffuser plate 10 and the back chassis 4. The lighting device 50 includes light source boards 13, 13, . . . , light-emitting elements 14, 14, . . . , board-side connectors 15, 15, . . . , flexible flat cables 16, 16, . . . , and cable-side connectors 17, 17, . . . (see FIG. 3).

The light source boards 13, 13, . . . are mounted on the front surface of the back chassis 4, spaced up and down and left and right, for example. In the lighting device 50, for example, six light source boards 13, 13, . . . spaced up and down constitute one group G, and four groups G of the light source boards 13, 13, . . . are disposed side by side up and down and left and right. A wiring pattern 18 is formed on each light source board 13. The wiring pattern 18 is formed by first wires 19, 19, . . . and second wires 20, 20, . . . (see FIG. 4).

The first wires 19, 19, . . . have first ends connected to the corresponding light-emitting elements 14, 14, . . . , and second ends individually provided as connections 21, 21, . . . connected to the board-side connector 15.

The first wires 19, 19, . . . are formed on both upper and lower edge portions of the light source board 13, and the second wires 20, 20, . . . are formed on central portions of the light source board 13 in the up-down direction.

Figure 3:
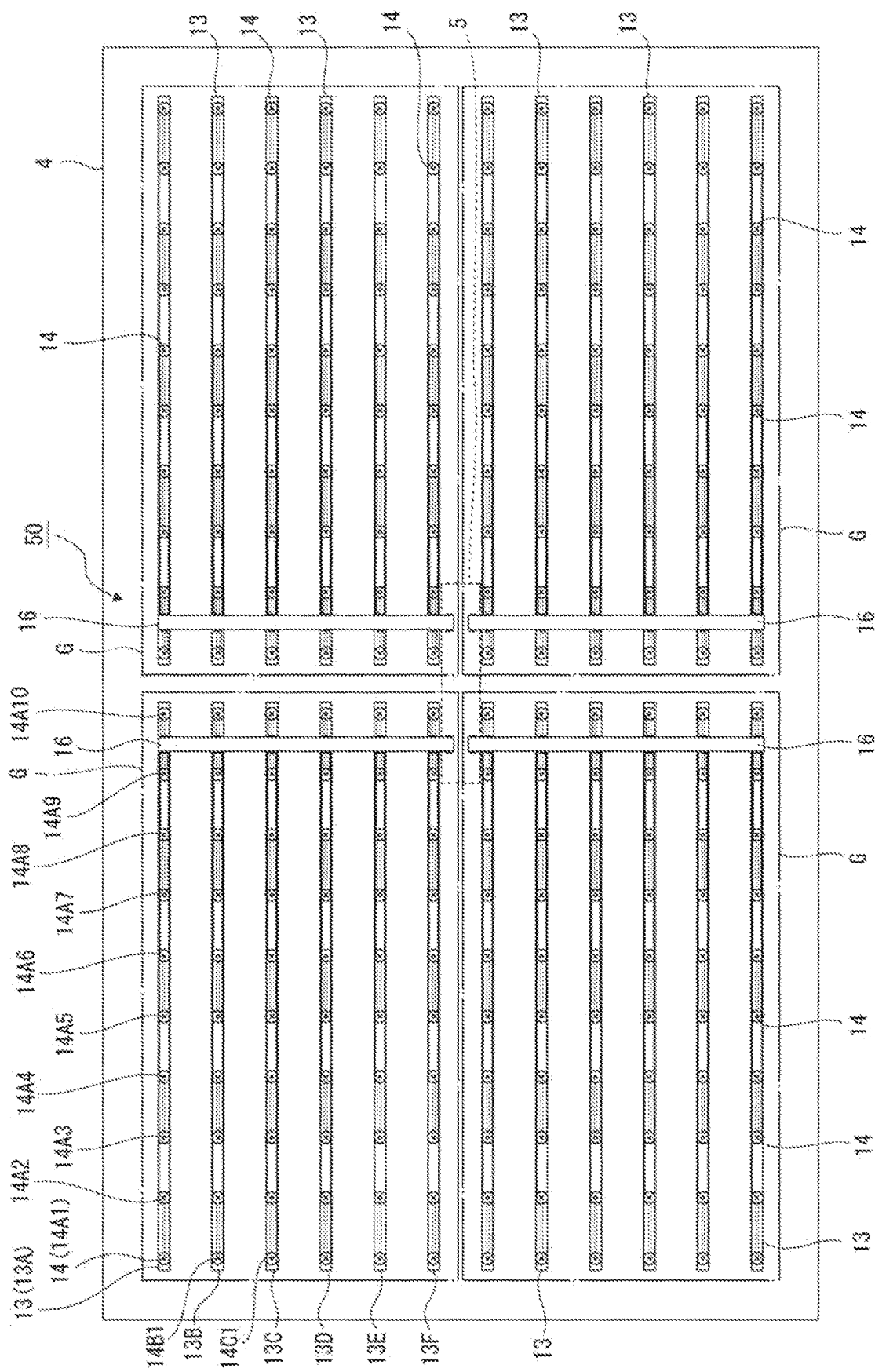
FIG. 3 is a front view showing a disposed state of light source boards on a back chassis, and others.
Figure 4:
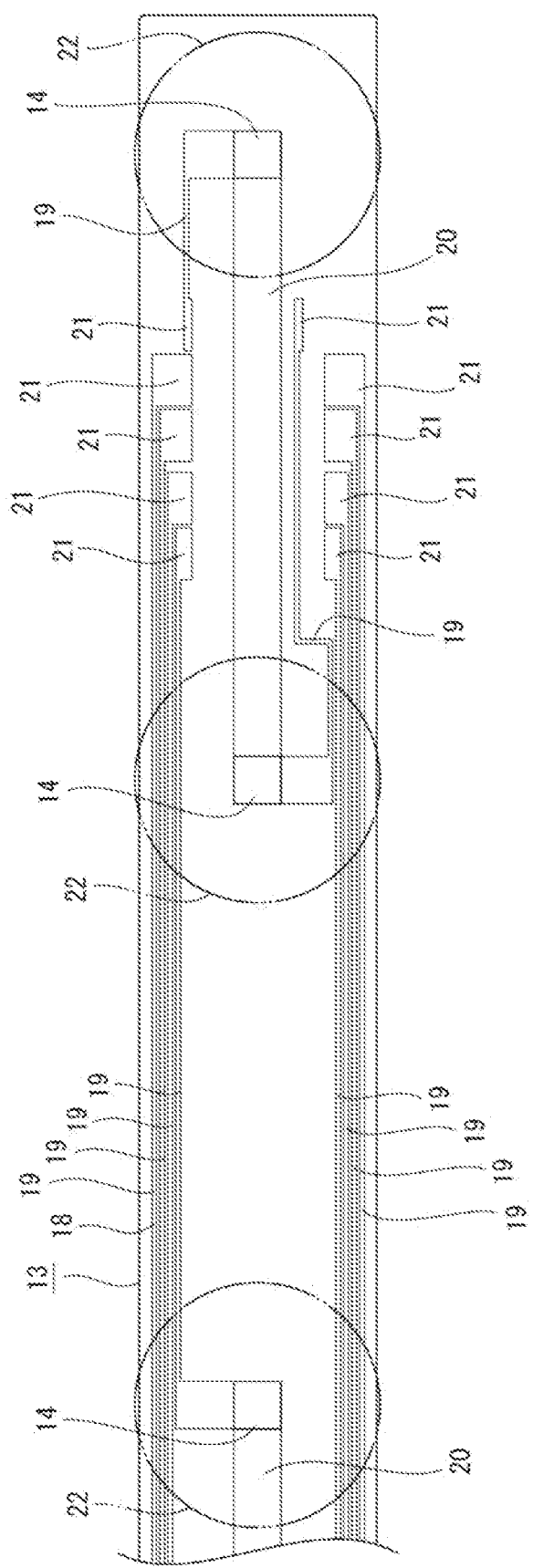
FIG. 4 is a front view showing part of the light source board.

The light-emitting elements 14, 14, . . . are spaced left and right on the front surface of each light source board 13 (see FIGS. 3 and 4). On each light source board 13, for example, ten light-emitting elements 14, 14, . . . are evenly spaced left and right. As the light-emitting elements 14, for example, light-emitting diodes (LEDs) are used. Each light-emitting element 14 is covered by a light diffusing lens 22 from the front, and is connected to the first wire 19 and the second wire 20 (see FIGS. 2 and 4). The light diffusing lens 22 is inserted through the insertion hole 11a of the reflective sheet 11, and is partly protruded forward from the reflective sheet 11.

Support pins 23, 23, . . . are attached to each light source board 13 (see FIG. 2). The support pins 23 are formed, for example, of a transparent resin material such as polycarbonate. The support pins 23 are attached to portions on the light source board 13 where the first wires 19, 19, . . . and the second wires 20, 20, . . . are not formed, and are protruded forward from the light source board 13. The support pins 23 are inserted through the insertion holes 11a of the reflective sheet 11 so that their distal ends can be in contact with the back surface of the diffuser plate 10, and have a function of holding the diffuser plate 10 while preventing deformation (bending) of the diffuser plate 10.

The board-side connectors 15, 15, . . . are mounted on portions closer to first ends in the longitudinal direction of the corresponding light source boards 13, 13, . . . (see FIG. 5). Each board-side connector 15 includes a body 24 formed in a horizontally long substantially rectangular tubular shape opened forward and backward, and electrodes 25, 25, . . . attached to the body 24. The internal space of the body 24 is formed as a coupling hole 24a. The electrodes 25, 25, . . . are attached to both upper and lower surfaces of the inner peripheral surface of the body 24, arranged at equal intervals left and right.

The body 24 of the board-side connector 15 is attached to the light source board 13. First end portions of the electrodes 25, 25, . . . are connected to the corresponding first wires 19, 19, . . . by, for example, soldering or the like. Second end portions of the electrodes 25 are provided as elastically deformable leaf springs 25a, and their distal end portions are protruded forward from the body 24.

Note that at each light source board 13, for example, five first wires 19, 19, . . . for positive electrodes and five first wires 19, 19, . . . for negative electrodes are formed on both the upper and lower edge portions, and the total ten first wires 19, 19, . . . are formed. The number of the electrodes 25, 25, . . . provided is greater than or equal to the number of the first wires 19, 19, . . . formed on each light source board 13. At each light source board 13, to each of the wires 19, 19, . . . , the corresponding one of the electrodes 25, 25, . . . is connected. Thus, the board-side connector 15 for each light source board 13 has the electrodes 25, 25, . . . connected to the first wires 19, 19, . . . and the electrodes 25, 25, . . . not connected to the first wires 19, 19, . . . .

Furthermore, for example, five second wires 20, 20, . . . are formed on each light source board 13, spaced left and right. Each second wire 20 connects two adjacent light-emitting elements 14 and 14 in series.

The flexible flat cables 16 are connected to the plurality of light source boards 13, 13, . . . via the cable-side connectors 17, 17, . . . and the board-side connectors 15, 15, . . . . Each flexible flat cable 16 is connected to a group G of six light source boards 13, 13, . . . (see FIG. 3). Thus, the lighting device 50 is provided, for example, with four flexible flat cables 16, 16, . . . for four groups. The four flexible flat cables 16, 16 are arranged side by side up and down and left and right at positions corresponding to central portions of the back chassis 4 in the left-right direction.

Figure 6:
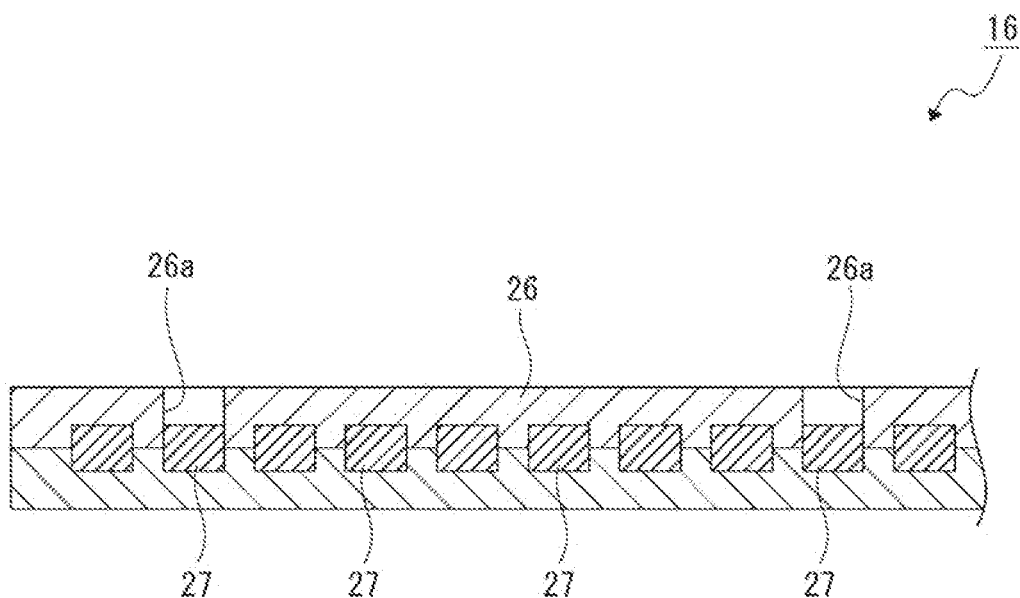
FIG. 6 is an enlarged cross-sectional view of the flexible flat cable.
Figure 7:
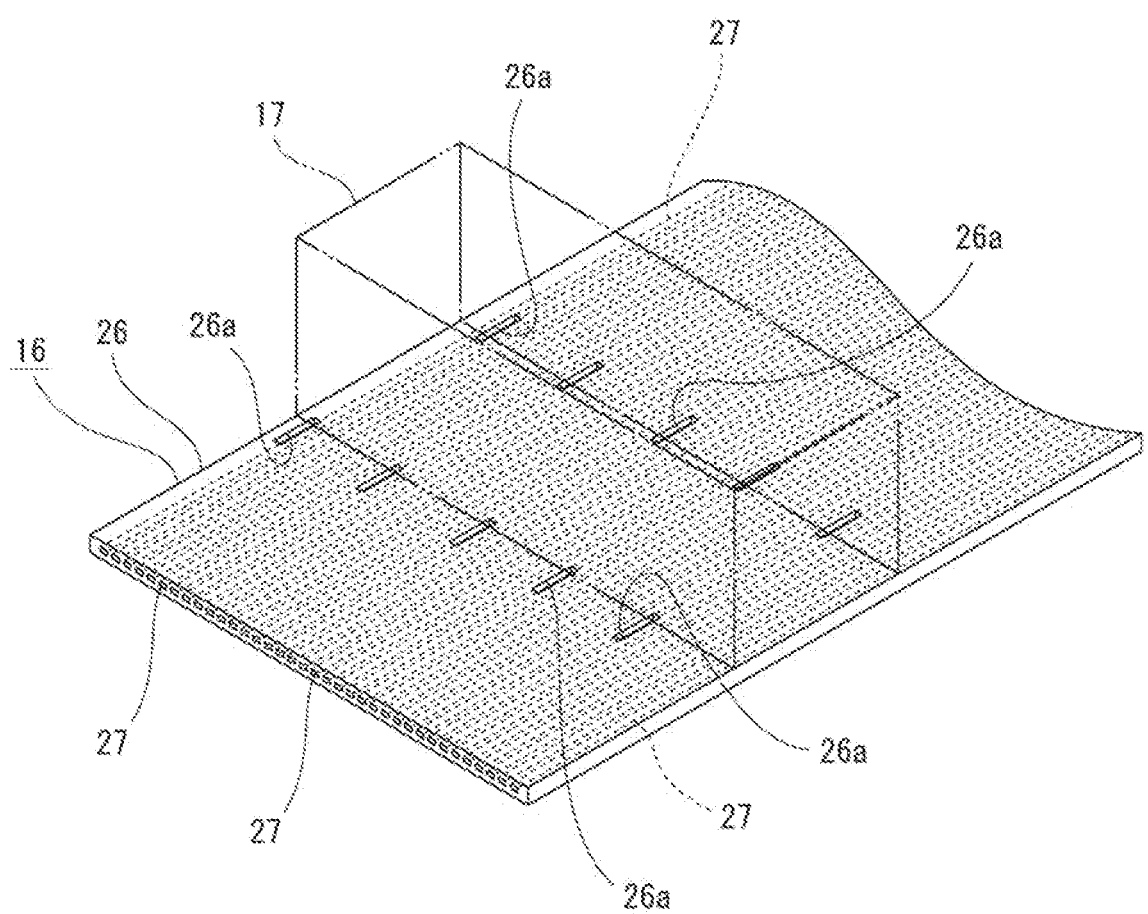
FIG. 7 is a perspective view showing part of the flexible flat cable and another component.
Figure 8:
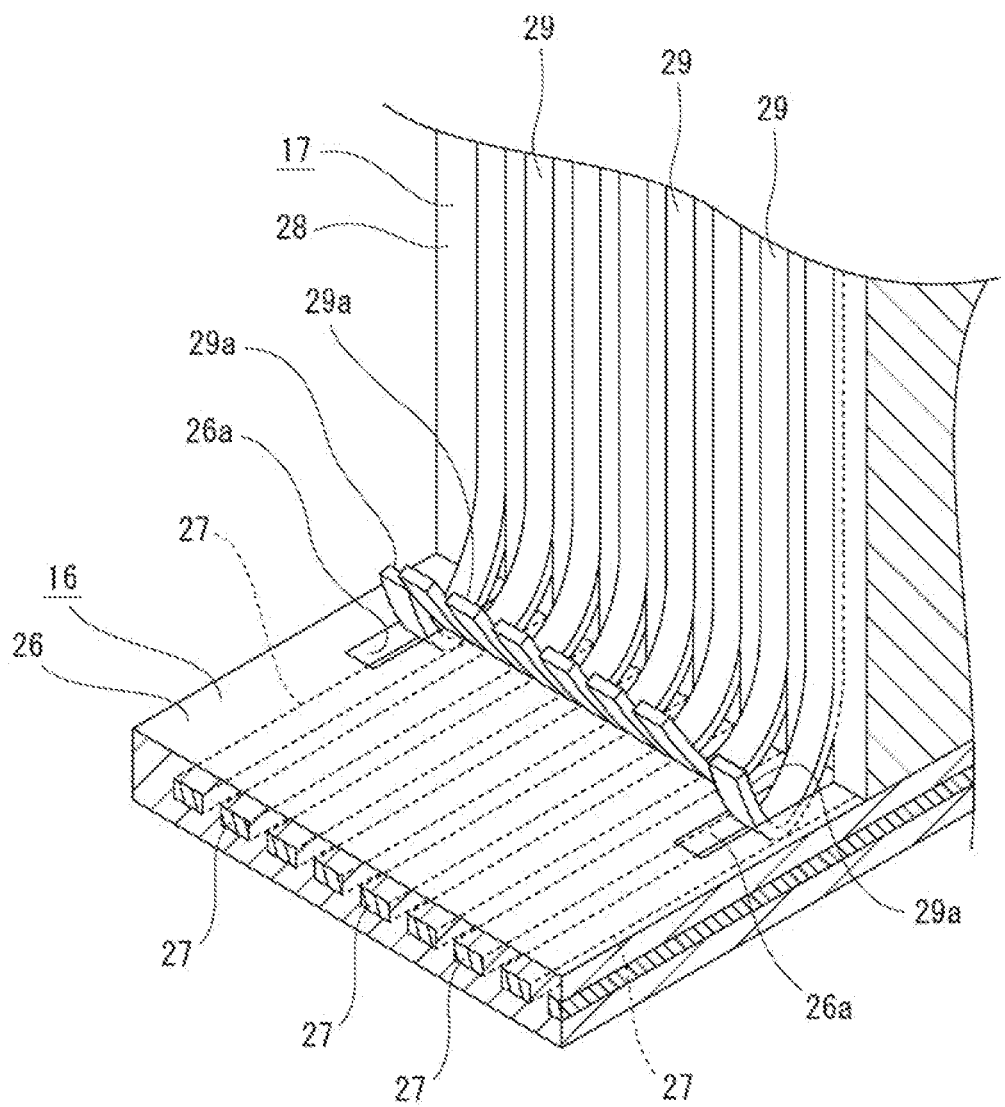
FIG. 8 is a perspective view showing the flexible flat cable and connection terminals of the cable-side connector.
Figure 10:
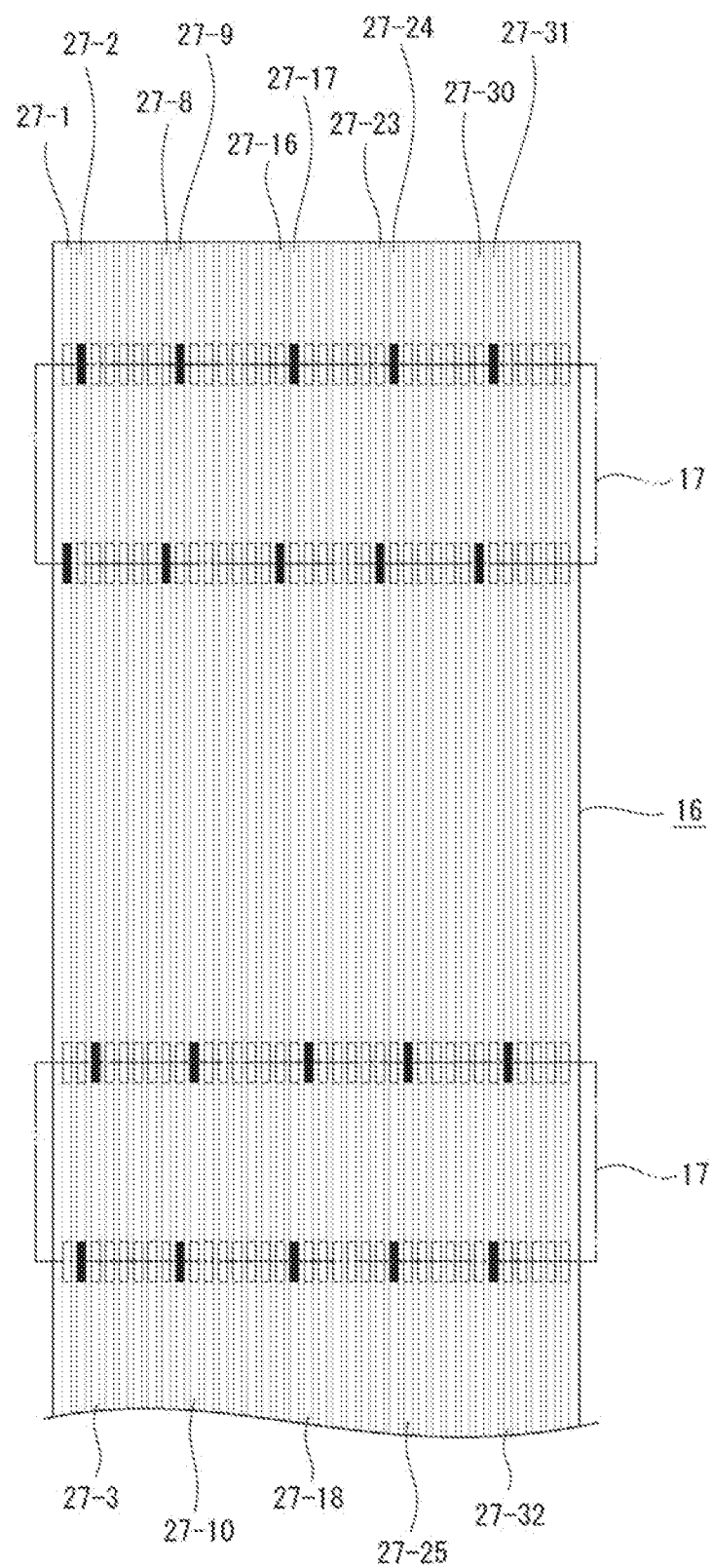
FIG. 10 is an enlarged front view conceptually showing the board-side connectors and the flexible flat cable.

Each flexible flat cable 16 is formed in a sheet shape, and has a multi-core structure including a flat-shaped insulator 26 and a plurality of conductors 27, 27, . . . aligned in a width direction orthogonal to a thickness direction of the insulator 26 (see FIG. 6). The insulator 26 includes a resin material, and includes two resin bases in a sheet shape crimped with the conductors 27, 27, . . . therebetween. The flexible flat cables 16 are inserted through the cable insertion holes of the back chassis 4 and connected at first ends in the longitudinal direction to the control board 5 mounted on the back surface of the back chassis 4.

Connection holes 26a, 26a, . . . opened in the thickness direction are formed in the insulator 26. Some conductors 27, 27, . . . of the conductors 27, 27, . . . are exposed through the connection holes 26a, 26a, . . . (see FIGS. 6 and 7).

Figure 5:
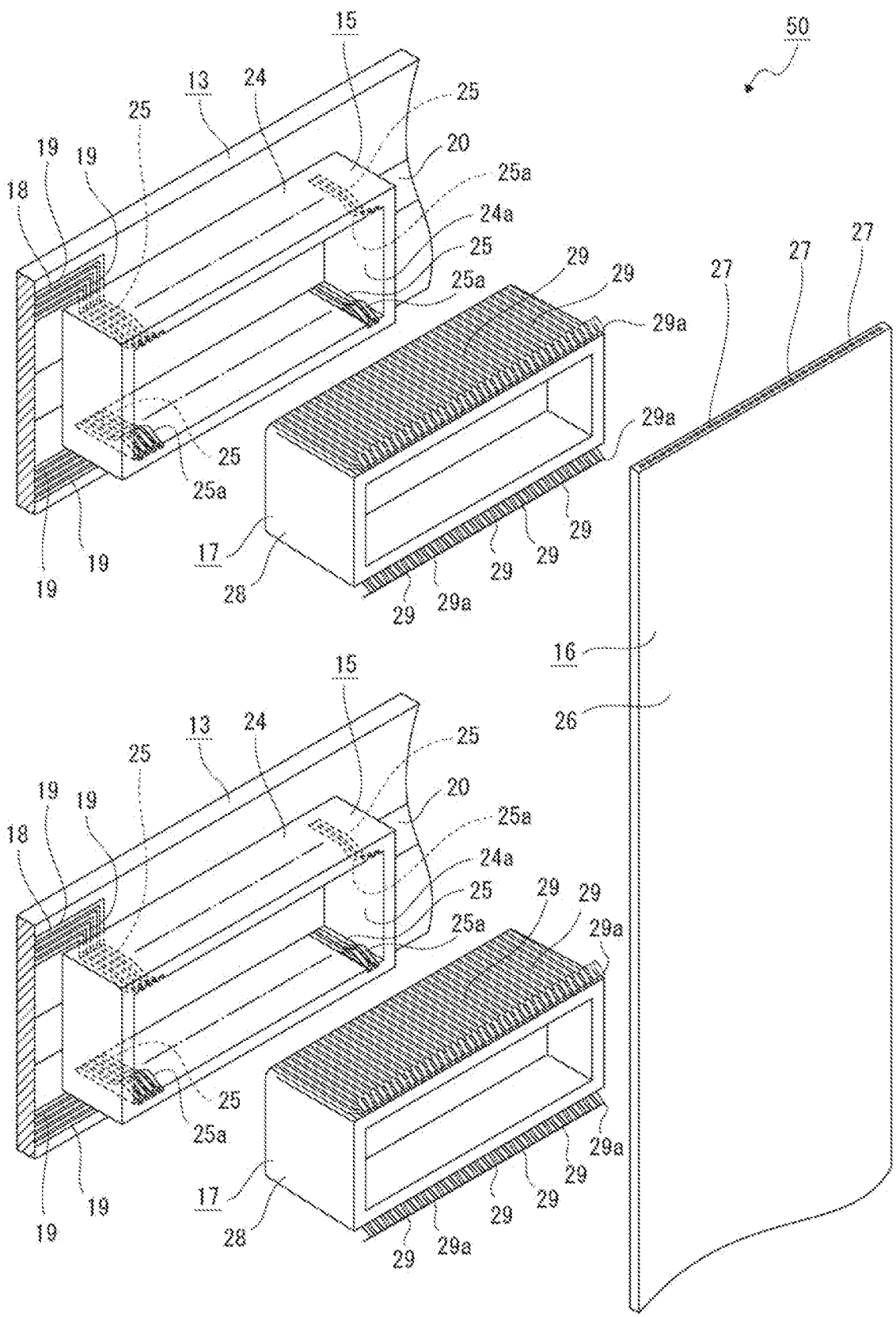
FIG. 5 is an exploded perspective view showing light source boards, board-side connectors, cable-side connectors, and a flexible flat cable.

The cable-side connectors 17, 17, . . . are attached to the flexible flat cable 16, and are evenly spaced in the longitudinal direction of the flexible flat cable 16 (see FIG. 5). Each cable-side connector 17 includes a base body 28 formed in a horizontally long shape and connection terminals 29, 29, . . . attached to the base body 28. The outer shape of the base body 28 is smaller than the outer shape of the body 24 of the board-side connector 15. The connection terminals 29, 29, . . . are attached to both upper and lower surfaces of the outer peripheral surface of the base body 28, arranged at equal intervals left and right.

Each cable-side connector 17 is attached at the base body 28 to the flexible flat cable 16. Each connection terminal 29 has a front end portion provided as an elastically deformable connection spring 29a. A distal end portion of the connection spring 29a is protruded forward from the base body 28. With the cable-side connector 17 attached to the flexible flat cable 16, the connection springs 29a, 29a . . . of the connection terminals 29, 29, . . . are pressed against the insulator 26 or inserted into the connection holes 26a, 26a, . . . (see FIG. 8). Thus, the connection springs 29a, 29a . . . inserted into the connection holes 26a, 26a, . . . are pressed against the corresponding conductors 27, 27, . . . to be connected.

Note that the connection terminals 29, 29, . . . of the cable-side connector 17 are connected to the electrodes 25, 25, . . . of the board-side connector 15, and only the connection terminals 29, 29, . . . connected to the electrodes 25, 25, . . . connected to the first wires 19, 19, . . . on the light source board 13 among the electrodes 25, 25, . . . are connected to the conductors 27, 27, . . . of the flexible flat cable 16. Thus, in the flexible flat cable 16, the connection holes 26a, 26a, . . . are formed only in portions against which the connection terminals 29, 29, . . . connected to the electrodes 25, 25, . . . connected to the first wires 19, 19, . . . are pressed.

The cable-side connector 17 is coupled to the board-side connector 15 by inserting the base body 28 into the coupling hole 24a. The board-side connector 15 and the cable-side connector 17 are each provided with, for example, an elastically deformable engaging portion (not shown). By the engaging portions being engaged with each other with the base body 28 inserted into the coupling hole 24a, the board-side connector 15 and the cable-side connector 17 are held in a coupled state.

In the state where the cable-side connector 17 is coupled to the board-side connector 15, the electrodes 25, 25, . . . of the board-side connector 15 are connected to the connection terminals 29, 29, . . . of the cable-side connector 17. At this time, parts of the connection terminals 29 are pressed against the leaf springs 25a, so that the leaf springs 25a are elastically deformed. The leaf springs 25a are connected to the connection terminals 29 in an elastically deformed state, ensuring stable connections between the electrodes 25 and the connection terminals 29.

<Electrical Connections in Lighting Device>

Next, a first example of electrical connections in the lighting device 50 will be described (see FIGS. 9 to 14). Note that in the first example of the electrical connections, the left-right direction will be described in a front view. In addition, portions shown by flecks or in black in FIGS. 9 to 13 indicate portions where electrical connections are made.

As described above, in the lighting device 50, for example, the six light source boards 13, 13, . . . spaced up and down constitute one group G, and the four groups G of the light source boards 13, 13, . . . are arranged side by side up and down and left and right. One group G includes, for example, light source boards 13A, 13B, 13C, 13D, 13E, and 13F in order from the top. On each of the light source boards 13A, 13B, 13C, 13D, 13E, and 13F, for example, ten light-emitting elements 14, 14, . . . are evenly spaced left and right.

Note that one flexible flat cable 16 is connected to one group G of the light source boards 13, 13, . . . via the corresponding board-side connectors 15, 15, . . . and cable-side connectors 17, 17, . . . , and the configurations and connections of the different groups G, G, . . . of the light source boards 13, 13, . . . , the board-side connectors 15, 15, . . . , the cable-side connectors 17, 17, . . . , and the flexible flat cables 16 are made similar. Therefore, connections in one group G of the light source boards 13, 13, . . . will be described below as an example.

Pairs of the adjacent light-emitting elements 14 and 14 on each light source board 13 are connected in series by the second wires 20 without the board-side connector 15 and the cable-side connector 17.

Specifically, the ten light-emitting elements 14, 14, . . . disposed on the light source board 13A are referred to as light-emitting elements 14A1, 14A2, 14A3, . . . , 14A10 in order from the left. The light-emitting element 14A1 and the light-emitting element 14A2 are connected in series by the second wire 20, the light-emitting element 14A3 and the light-emitting element 14A4 are connected in series by the second wire 20, the light-emitting element 14A5 and the light-emitting element 14A6 are connected in series by the second wire 20, the light-emitting element 14A7 and the light-emitting element 14A8 are connected in series by the second wire 20, and the light-emitting element 14A9 and the light-emitting element 14A10 are connected in series by the second wire 20.

Similarly, the ten light-emitting elements 14, 14, . . . disposed on the light source board 13B are referred to as light-emitting elements 14B1, 14B2, 14B3, . . . , 14B10 in order from the left. The light-emitting element 14B1 and the light-emitting element 14B2 are connected in series by the second wire 20, the light-emitting element 14B3 and the light-emitting element 14B4 are connected in series by the second wire 20, the light-emitting element 14B5 and the light-emitting element 14B6 are connected in series by the second wire 20, the light-emitting element 14B7 and the light-emitting element 14B8 are connected in series by the second wire 20, and the light-emitting element 14B9 and the light-emitting element 14B10 are connected in series by the second wire 20.

For the light-emitting elements 14, 14, . . . disposed on the light source boards 13C to 13F below, pairs of the adjacent light-emitting elements 14 and 14 are similarly connected in series by the second wires 20 without the board-side connector 15 and the cable-side connector 17.

The connections 21, 21, . . . of the first wires 19, 19, . . . formed on the light source board 13A are referred to as connections 21A1, 21A2, . . . , 21A10, respectively. The first wires 19, 19, . . . having the corresponding connections 21A1, 21A2, . . . , 21A10 are connected to the light-emitting elements 14A1, 14A2, . . . , 14A10, respectively.

At the light source board 13A, for example, the connections 21A8, 21A6, 21A4, 21A2, and 21A10 are aligned in order from the left on the upper edge portion, and the connections 21A7, 21A5, 21A3, 21A1, and 21A9 are aligned in order from the left on the lower edge portion.

Similarly, the connections 21, 21, . . . of the first wires 19, 19, . . . formed on the light source board 13B are referred to as connections 21B1, 21B2, . . . , 21B10. The first wires 19, 19, . . . having the corresponding connections 21B1, 21B2, . . . , 21B10 are connected to the light-emitting elements 14B1, 14B2, . . . , 14B10, respectively. At the light source board 13B, for example, the connections 21B8, 21B6, 21B4, 21B2, and 21B10 are aligned in order from the left on the upper edge portion, and the connections 21B7, 21B5, 21B3, 21B1, and 21B9 are aligned in order from the left on the lower edge portion.

The connections 21, 21, . . . of the first wires 19, 19, . . . formed on the light source boards 13C to 13F below are also aligned in similar orders.

Each board-side connector 15 is provided with the same number of the electrodes 25, 25, . . . aligned left and right on both upper and lower sides. For example, seven electrodes 25 are provided for each of the connections 21, 21, . . . . Thus, for example, thirty-five electrodes 25, 25, . . . are aligned left and right on the upper side, and thirty-five electrodes 35, 35, . . . are aligned left and right on the lower side.

Similarly, each cable-side connector 17 is provided with the connection terminals 29, 29, . . . on both upper and lower sides, for example, thirty-five are aligned left and right on the upper side, and thirty-five are aligned left and right on the lower side.

In the flexible flat cable 16, the number of the conductors 27, 27, . . . is more than or equal to half of the number of the electrodes 25, 25, . . . in the board-side connector 15. The conductors 27, 27, . . . are referred to as conductors 27-1, 27-2, 27-3, . . . from the left.

In the above configuration, the first example of the electrical connections in the lighting device 50 will be described in detail mainly with reference to part of the lighting device 50 shown in FIGS. 11 to 13.

Figure 11:
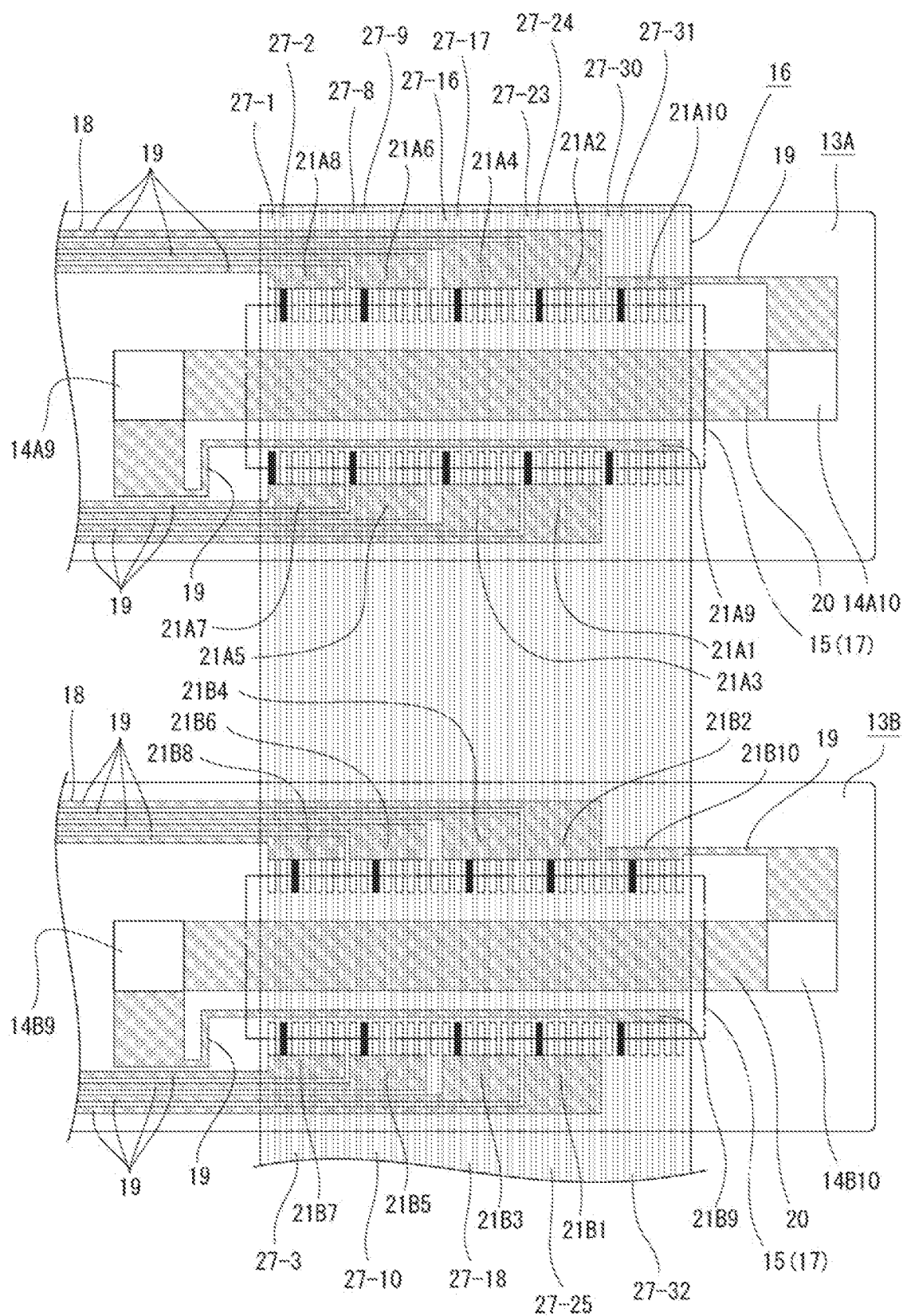
FIG. 11 is an enlarged front view conceptually showing connections between the light source boards and the flexible flat cable.

Note that FIG. 11 is a conceptual diagram of a portion including the light-emitting elements 14A9, 14A10, 14B9, and 14B10 of the light source board 13A and the light source board 13B. FIG. 12 is a conceptual diagram of a portion including the light-emitting elements 14C9, 14C10, 14D9, and 14D10 of the light source board 13C and the light source board 13D. FIG. 13 is a conceptual diagram of a portion including the light-emitting elements 14E9, 14E10, 14F9, and 14F10 of the light source board 13E and the light source board 13F.

The first wires 19 formed on the light source boards 13 are electrically connected to the conductors 27 of the flexible flat cable 16 via the electrodes 25 of the board-side connectors 15 and the connection terminals 29 of the cable-side connectors 17. Note that the connection 21 of each first wire 19 is connected to the corresponding seven electrodes 25, 25, . . . , and these seven electrodes 25, 25, . . . are connected to the corresponding connection terminals 29, 29, . . . . Of the connection terminals 29, 29, . . . connected to the corresponding seven electrodes 25, 25, . . . , only one connection terminal 29 is connected to one conductor 27 via the connection hole 26a. Thus, the connection 21 of each first wire 19 is electrically connected to one conductor 27 via the electrode 25 of the board-side connector 15 and the connection terminal 29 of the cable-side connector 17.

In the first wires 19, 19, . . . formed on the upper edge portion of the light source board 13A, as shown in FIG. 11, for example, the connection 21A8 is electrically connected to the conductor 27-2, the connection 21A6 to the conductor 27-9, the connection 21A4 to the conductor 27-17, the connection 21A2 to the conductor 27-24, and the connection 21A10 to the conductor 27-31. Furthermore, in the first wires 19, 19, . . . formed on the lower edge portion of the light source board 13A, for example, the connection 21A7 is electrically connected to the conductor 27-1, the connection 21A5 to the conductor 27-8, the connection 21A3 to the conductor 27-16, the connection 21A1 to the conductor 27-23, and the connection 21A9 to the conductor 27-30.

In the first wires 19, 19, . . . formed on the upper edge portion of the light source board 13B, for example, the connection 21B8 is electrically connected to the conductor 27-3, the connection 21B6 to the conductor 27-10, the connection 21B4 to the conductor 27-18, the connection 21B2 to the conductor 27-25, and the connection 21B10 to the conductor 27-32. Furthermore, in the first wires 19, 19, . . . formed on the lower edge portion of the light source board 13B, for example, the connection 21B7 is electrically connected to the conductor 27-2, the connection 21B5 to the conductor 27-9, the connection 21B3 to the conductor 27-17, the connection 21B1 to the conductor 27-24, and the connection 21B9 to the conductor 27-31.

Thus, in the first example, the connection 21A8 and the connection 21B7 are both electrically connected to the conductor 27-2, the connection 21A6 and the connection 21B5 are both electrically connected to the conductor 27-9, the connection 21A4 and the connection 21B3 are both electrically connected to the conductor 27-17, the connection 21A2 and the connection 21B1 are both electrically connected to the conductor 27-24, and the connection 21A10 and the connection 21B9 are both electrically connected to the conductor 27-31.

Consequently, the light-emitting element 14A8 and the light-emitting element 14B7 are connected in series via the conductor 27-2, the light-emitting element 14A6 and the light-emitting element 14B5 are connected in series via the conductor 27-9, the light-emitting element 14A4 and the light-emitting element 14B3 are connected in series via the conductor 27-17, the light-emitting element 14A2 and the light-emitting element 14B1 are connected in series via the conductor 27-24, and the light-emitting element 14A10 and the light-emitting element 14B9 are connected in series via the conductor 27-31.

Furthermore, in the lighting device 50, since the pairs of the adjacent light-emitting elements 14 and 14 are connected in series by the second wires 20 as described above, sets of four light-emitting elements 14, 14, . . . are connected in series in each set. Specifically, the light-emitting element 14A1, the light-emitting element 14A2, the light-emitting element 14B1, and the light-emitting element 14B2 are connected in series, the light-emitting element 14A3, the light-emitting element 14A4, the light-emitting element 14B3, and the light-emitting element 14B4 are connected in series, the light-emitting element 14A5, the light-emitting element 14A6, the light-emitting element 14B5, and the light-emitting element 14B6 are connected in series, the light-emitting element 14A7, the light-emitting element 14A8, the light-emitting element 14B7, and the light-emitting element 14B8 are connected in series, and the light-emitting element 14A9, the light-emitting element 14A10, the light-emitting element 14B9, and the light-emitting element 14B10 are connected in series.

Figure 12:
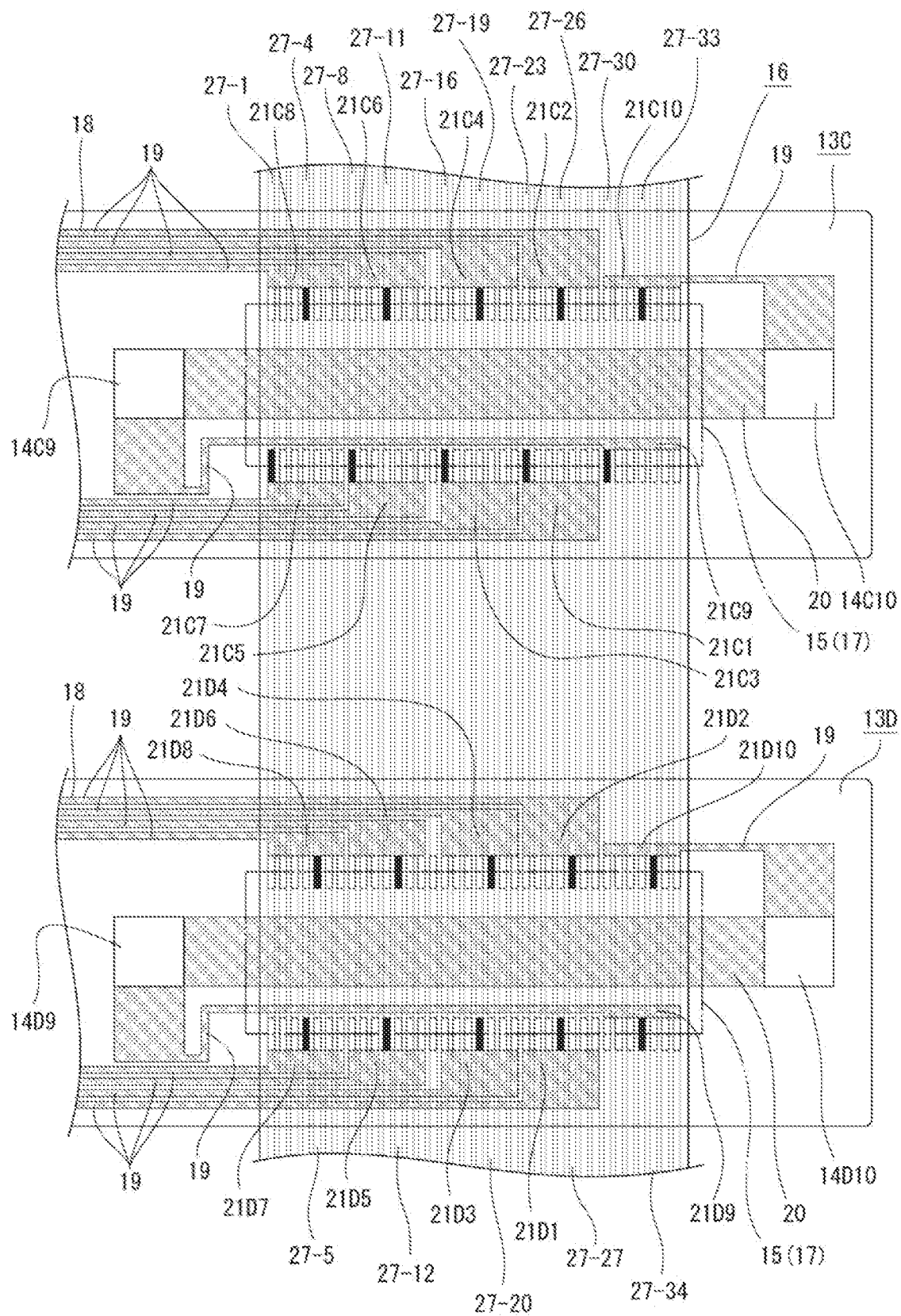
FIG. 12 is an enlarged front view conceptually showing connections between other light source boards and the flexible flat cable.

In the first wires 19, 19, . . . formed on the upper edge portion of the light source board 13C, as shown in FIG. 12, for example, the connection 21C8 is electrically connected to the conductor 27-4, the connection 21C6 to the conductor 27-11, the connection 21C4 to the conductor 27-19, the connection 21C2 to the conductor 27-26, and the connection 21C10 to the conductor 27-33. Furthermore, in the first wires 19, 19, . . . formed on the lower edge portion of the light source board 13C, for example, the connection 21C7 is electrically connected to the conductor 27-1, the connection 21C5 to the conductor 27-8, the connection 21C3 to the conductor 27-16, the connection 21C1 to the conductor 27-23, and the connection 21C9 to the conductor 27-30.

In the first wires 19, 19, . . . formed on the upper edge portion of the light source board 13D, for example, the connection 21D8 is electrically connected to the conductor 27-5, the connection 21D6 to the conductor 27-12, the connection 21D4 to the conductor 27-20, the connection 21D2 to the conductor 27-27, and the connection 21D10 to the conductor 27-34. Furthermore, in the first wires 19, 19, . . . formed on the lower edge portion of the light source board 13D, for example, the connection 21D7 is electrically connected to the conductor 27-4, the connection 21D5 to the conductor 27-11, the connection 21D3 to the conductor 27-19, the connection 21D1 to the conductor 27-26, and the connection 21D9 to the conductor 27-33.

Consequently, in the light-emitting elements 14, 14, . . . disposed on each of the light source board 13C and the light source board 13D, the light-emitting element 14C1, the light-emitting element 14C2, the light-emitting element 14D1, and the light-emitting element 14D2 are connected in series, the light-emitting element 14C3, the light-emitting element 14C4, the light-emitting element 14D3, and the light-emitting element 14D4 are connected in series, the light-emitting element 14C5, the light-emitting element 14D5, and the light-emitting element 14D6 are connected in series, the light-emitting element 14C7, the light-emitting element 14C8, the light-emitting element 14D7, and the light-emitting element 14D8 are connected in series, and the light-emitting element 14C9, the light-emitting element 14C10, the light-emitting element 14D9, and the light-emitting element 14D10 are connected in series.

Figure 13:
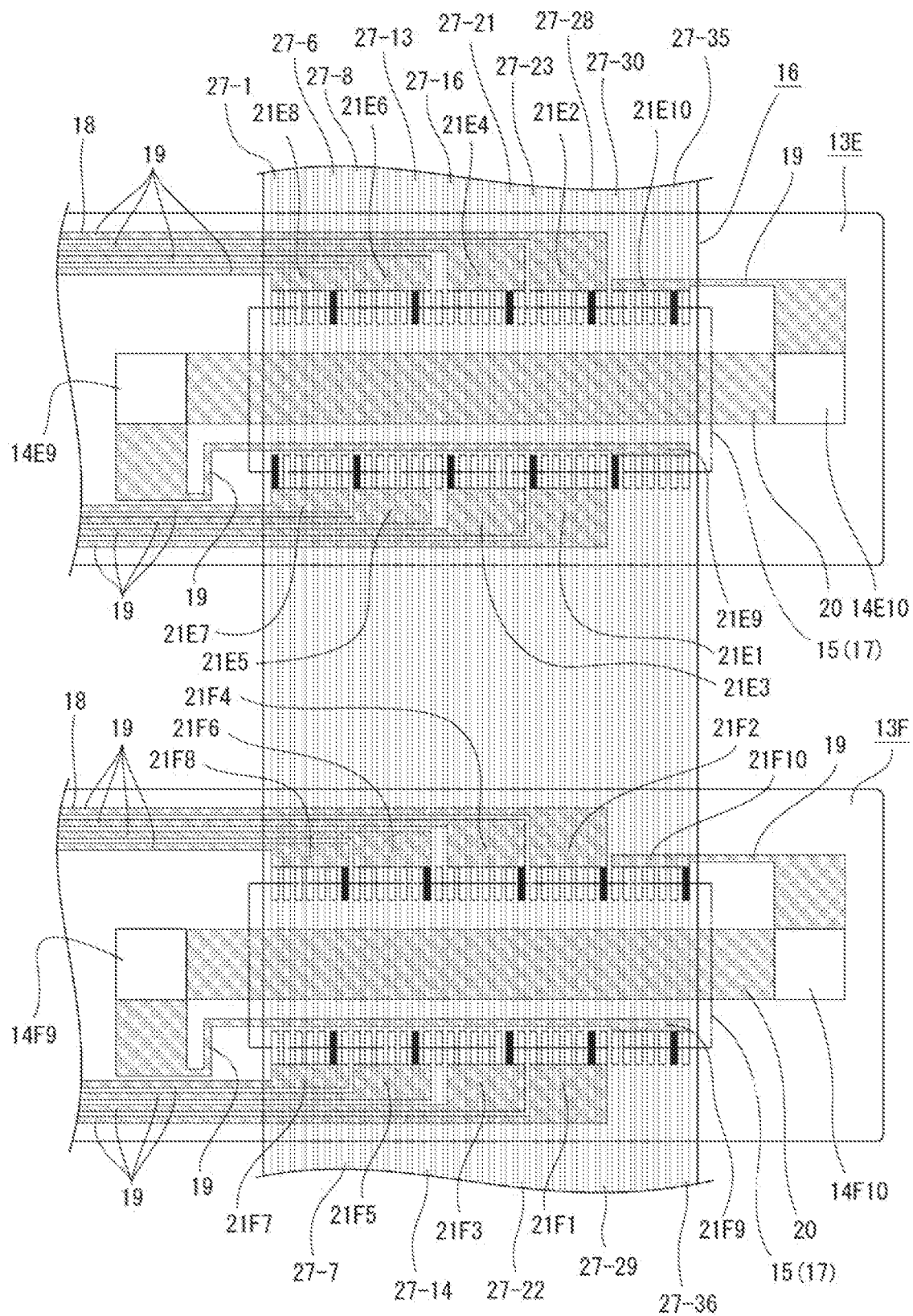
FIG. 13 is an enlarged front view conceptually showing connections between still other light source boards and the flexible flat cable.
Figure 14:
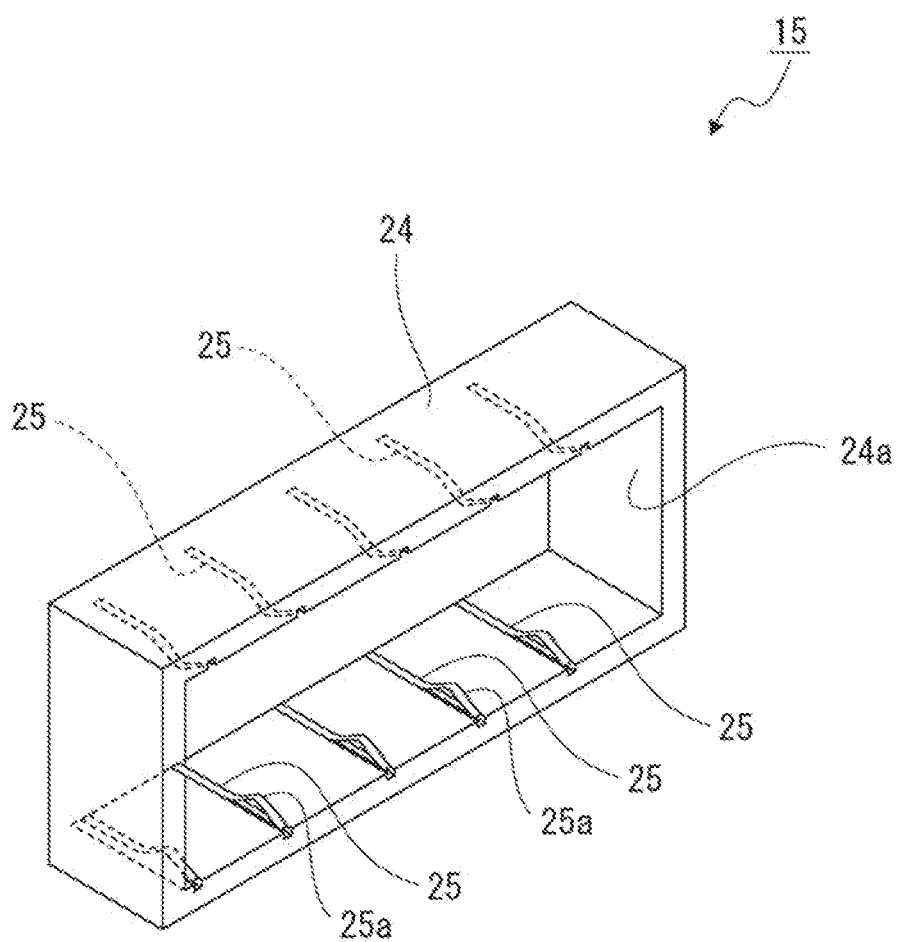
FIG. 14 is a perspective view showing the board-side connector provided only with electrodes connected to first wires.
Figure 15:
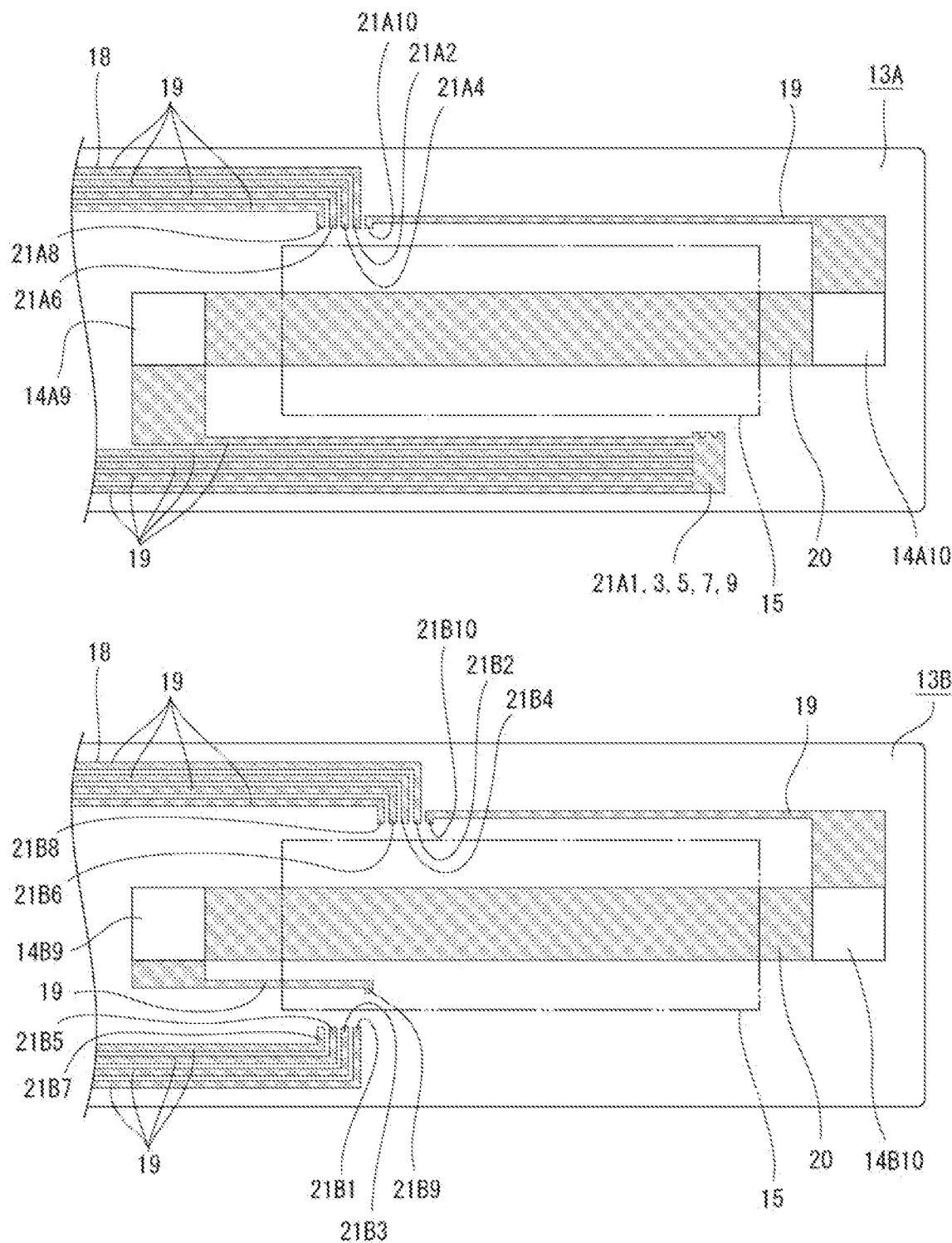
FIG. 15 shows a second example of electrical connections in the lighting device together with FIGS. 16 to 19, and this figure is an enlarged front view showing part of the light source boards.
Figure 16:
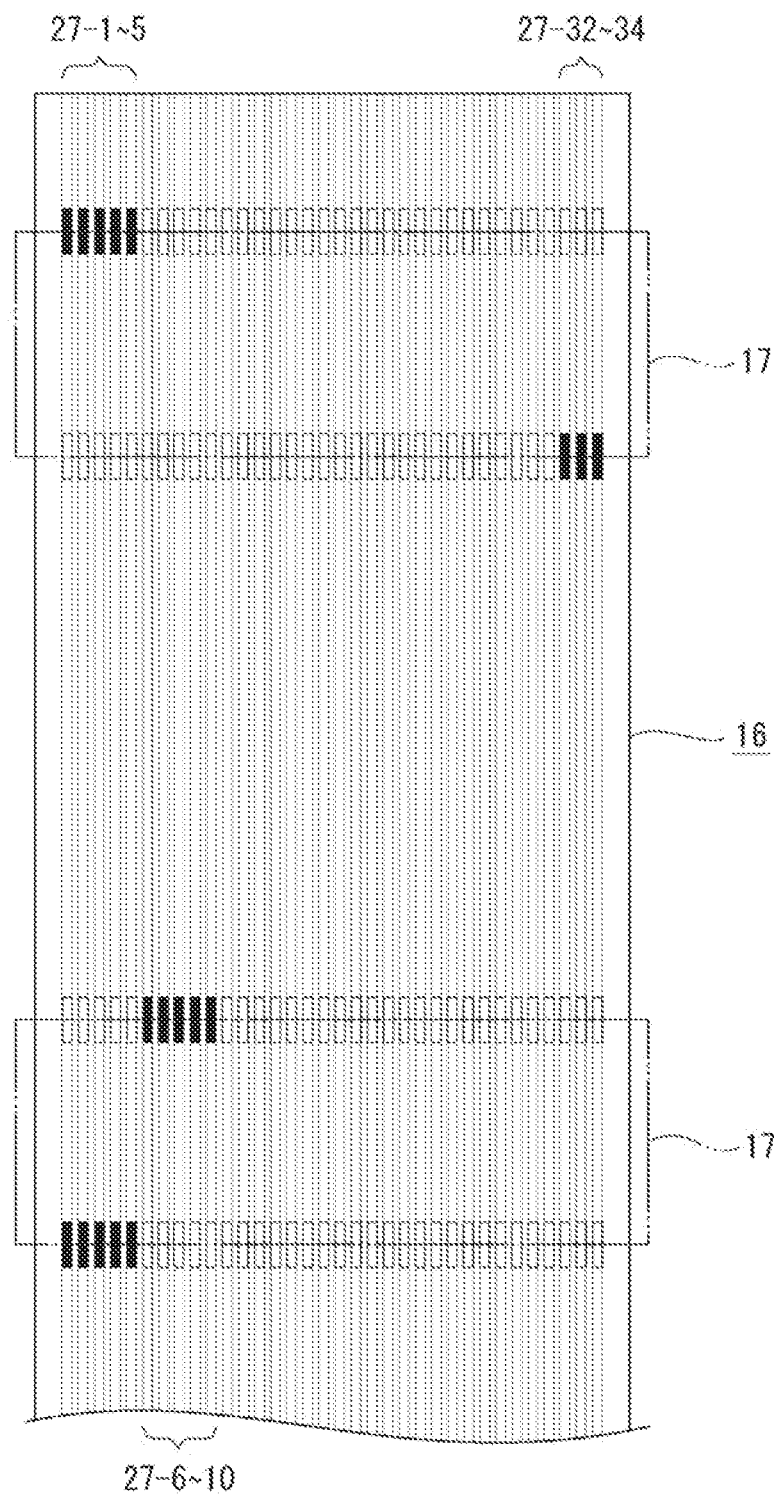
FIG. 16 is an enlarged front view conceptually showing the board-side connectors and the flexible flat cable.

In the first wires 19, 19, . . . formed on the upper edge portion of the light source board 13E, as shown in FIG. 13, for example, the connection 21E8 is electrically connected to the conductor 27-6, the connection 21E6 to the conductor 27-13, the connection 21E4 to the conductor 27-21, the connection 21E2 to the conductor 27-28, and the connection 21E10 to the conductor 27-35. Furthermore, in the first wires 19, 19, . . . formed on the lower edge portion of the light source board 13E, for example, the connection 21E7 is electrically connected to the conductor 27-1, the connection 21E5 to the conductor 27-8, the connection 21E3 to the conductor 27-16, the connection 21E1 to the conductor 27-23, and the connection 21E9 to the conductor 27-30.

In the first wires 19, 19, . . . formed on the upper edge portion of the light source board 13F, for example, the connection 21F8 is electrically connected to the conductor 27-7, the connection 21F6 to the conductor 27-14, the connection 21F4 to the conductor 27-22, the connection 21F2 to the conductor 27-29, and the connection 21F10 to the conductor 27-36. Furthermore, in the first wires 19, 19, . . . formed on the lower edge portion of the light source board 13F, for example, the connection 21F7 is electrically connected to the conductor 27-6, the connection 21F5 to the conductor 27-13, the connection 21F3 to the conductor 27-21, the connection 21F1 to the conductor 27-28, and the connection 21F9 to the conductor 27-35.

Consequently, in the light-emitting elements 14, 14, . . . disposed on each of the light source board 13E and the light source board 13F, the light-emitting element 14E1, the light-emitting element 14E2, the light-emitting element 14F1, and the light-emitting element 14F2 are connected in series, the light-emitting element 14E3, the light-emitting element 14E4, the light-emitting element 14F3, and the light-emitting element 14F4 are connected in series, the light-emitting element 14E5, the light-emitting element 14E6, the light-emitting element 14F5, and the light-emitting element 14F6 are connected in series, the light-emitting element 14E7, the light-emitting element 14E8, the light-emitting element 14F7, and the light-emitting element 14F8 are connected in series, and the light-emitting element 14E9, the light-emitting element 14E10, the light-emitting element 14F9, and the light-emitting element 14F10 are connected in series.

As described above, in the first example, the pairs of the light-emitting elements 14, 14, . . . disposed on each of the different light source boards 13 and 13 are connected in series via the board-side connectors 15, the cable-side connectors 17, and the flexible flat cable 16.

Consequently, the light-emitting elements 14, 14, . . . disposed on each of the different light source boards 13 and 13 are simultaneously switched on and off, thus allowing improvement in the degree of freedom in control over the light-emitting elements 14, 14, . . . disposed on each of the light source boards 13, 13, . . . .

In addition, since the sets of the four light-emitting elements 14, 14, . . . adjacent to each other up and down and left and right are connected in series in each set, the positions of these four light-emitting elements 14, 14, . . . are in a positional relationship close to the form of one pixel.

Therefore, it is particularly useful in performing so-called local dimming, which is a technique of dividing a screen into sections, controlling the amount of light of light-emitting elements on a section-by-section basis, and adjusting the amount of light of the light-emitting elements according to the brightness of an image displayed on each section, and can significantly improve the contrast of an image displayed on the screen and can reduce power consumption in the lighting device 50.

Note that in the first example described above, the example in which the four light-emitting elements 14, 14, . . . adjacent to each other up and down and left and right are connected in series with each other has been described, but the number of the light-emitting elements 14 connected in series is not limited to four and may be any number, and further, the light-emitting elements 14, 14, . . . connected in series may be the light-emitting elements 14, 14, . . . disposed at whatever positions. Furthermore, in the display device 1, the light-emitting elements 14, 14, . . . may not be connected in series, and all the light-emitting elements 14, 14, . . . may be individually switched on and off.

Furthermore, in the first example, the plurality of connection terminals 29, 29, . . . is provided on each cable-side connector 17, the connection holes 26a, 26a, . . . are formed in the insulator 26 of each flexible flat cable 16 to expose some of the conductors 27, 27, . . . , and the connection terminals 29, 29, . . . are inserted into the connection holes 26a, 26a, . . . to be connected to the conductors 27, 27, . . . .

Thus, the connection terminals 29 are inserted into the connection holes 26a to be connected to the conductors 27, and some of the plurality of conductors 27 are electrically connected to the first wires 19, so that connection between the conductors 27 and the first wires 19 and insulation between the conductors 27 and the first wires 19 can be facilitated.

Moreover, by forming the connection holes 26a in the insulator 26 of each flexible flat cable 16 for connection and insulation between the conductors 27 and the first wires 19, the wiring patterns 18, 18, . . . of the light source boards 13, 13, . . . need not be changed at each of the light source boards 13, 13, . . . . Thus, the same light source boards 13, 13, . . . can be used to connect the first wires 19, 19, . . . and the conductors 27, 27, . . . , allowing a reduction in the manufacturing cost of the lighting device 50.

Note that the above has described the example in which the connection holes 26a are formed in each flexible flat cable 16 for connection and insulation between the conductors 27 and the first wires 19, but, for example, the electrodes 25, 25, . . . may be provided on each board-side connector 15 only at positions to be connected to the first wires 19, 19, . . . , and the connection terminals 29, 29, . . . may be connected to some of the electrodes 25, 25, . . . (see FIG. 14).

Thus, each cable-side connector 17 is provided with the connection terminals 29, 29, . . . each connected to the corresponding one of the plurality of conductors 27, 27, . . . , and each board-side connector 15 is provided with the connection terminals 29, 29, . . . connected to some of the electrodes 25, 25, . . . , so that the connection terminals 29, 29, . . . are connected to the electrodes 25, 25, . . . , and some of the conductors 27, 27, . . . are electrically connected to the first wires 19, 19, . . . .

Thus, connection between the conductors 27 and the first wires 19 and insulation between the conductors 27 and the first wires 19 are provided by the presence and absence of the electrodes 25 for the connection terminals 29. Consequently, the plurality of light source boards 13, 13, . . . having the same wiring patterns 18, 18, . . . can be used to reduce the manufacturing cost of the lighting device 50.

Furthermore, on the contrary, each cable-side connector 17 may be provided with the connection terminals 29, 29, . . . only at positions to be connected to the electrodes 25, 25, . . . connected to the first wires 19, 19, . . . , so that the connection terminals 29, 29, . . . are connected to some of the electrodes 25, 25, . . . .

<Second Example in Electrical Connections>

Next, a second example in electrical connections in the lighting device 50 will be described (see FIGS. 15 to 19).

Note that the second example in the electrical connections described below is different from the first example in the electrical connections described above only in that all of the connection terminals 29, 29, . . . of the cable-side connectors 17 are connected to the conductors 27, 27, . . . of the flexible flat cable 16 via the connection holes 26a, 26a, . . . , and the wiring patterns 18, 18, . . . of the light source boards 13, 13, . . . are different from each other. Therefore, in the second example, only parts different from those in the first example will be mainly described in detail, and the other parts are assigned the same reference numerals as the reference numerals assigned to similar parts in the first example to omit or abbreviate description.

Note that in the second example of the electrical connections, the left-right direction will be described in a front view. In addition, portions shown by flecks or in black in FIGS. 15 to 19 indicate portions where electrical connections are made. In addition, portions shown by flecks in FIGS. 15 to 19 indicate portions where electrical connections are made.

The connections 21, 21, . . . of the first wires 19, 19, . . . formed on the light source board 13A are referred to as connections 21A1, 21A2, . . . , 21A10, respectively. The first wires 19, 19, . . . having the corresponding connections 21A1, 21A2, . . . , 21A10 are connected to the light-emitting elements 14A1, 14A2, . . . , 14A10, respectively.

Note that the connections 21A1, 21A3, 21A5, 21A7, and 21A9 are united.

On the light source board 13A, for example, the connections 21A8, 21A6, 21A4, 21A2, and 21A10 are aligned in order from the left on the upper edge portion, and the connections 21A1, 21A3, 21A5, 21A7, and 21A9 are united on the lower edge portion.

Similarly, the connections 21, 21, . . . of the first wires 19, 19, . . . formed on the light source board 13B are referred to as connections 21B1, 21B2, . . . , 21B10. The first wires 19, 19, . . . having the corresponding connections 21B1, 21B2, . . . , 21B10 are connected to the light-emitting elements 14B1, 14B2, . . . , 14B10, respectively. At the light source board 13, for example, the connections 21B8, 21B6, 21B4, 21B2, and 21B10 are aligned in order from the left on the upper edge portion, and the connections 21B7, 21B5, 21B3, 21B1, and 21B9 are aligned in order from the left on the lower edge portion.

The connections of the first wires 19, 19, . . . formed on the light source board 13C and the light source board 13D below are configured like the connections of the first wires 19, 19, . . . formed on the light source board 13A and the light source board 13B, respectively. Furthermore, the connections of the first wires 19, 19, . . . formed on the light source board 13E and the light source board 13F are configured like the connections of the first wires 19, 19, . . . formed on the light source board 13A and the light source board 13B, respectively.

Each board-side connector 15 is provided with the same number of the electrodes 25, 25, . . . aligned left and right on both the upper and lower sides, for example, thirty-four are aligned left and right on the upper side, and thirty-four are aligned left and right on the lower side.

Similarly, each cable-side connector 17 is provided with the connection terminals 29, 29, . . . on both the upper and lower sides, for example, thirty-four are aligned left and right on the upper side, and thirty-four are aligned left and right on the lower side.

In the above configuration, the second example of the electrical connections in the lighting device 50 will be described in detail mainly with reference to part of the lighting device 50 shown in FIGS. 17 to 19.

Figure 17:
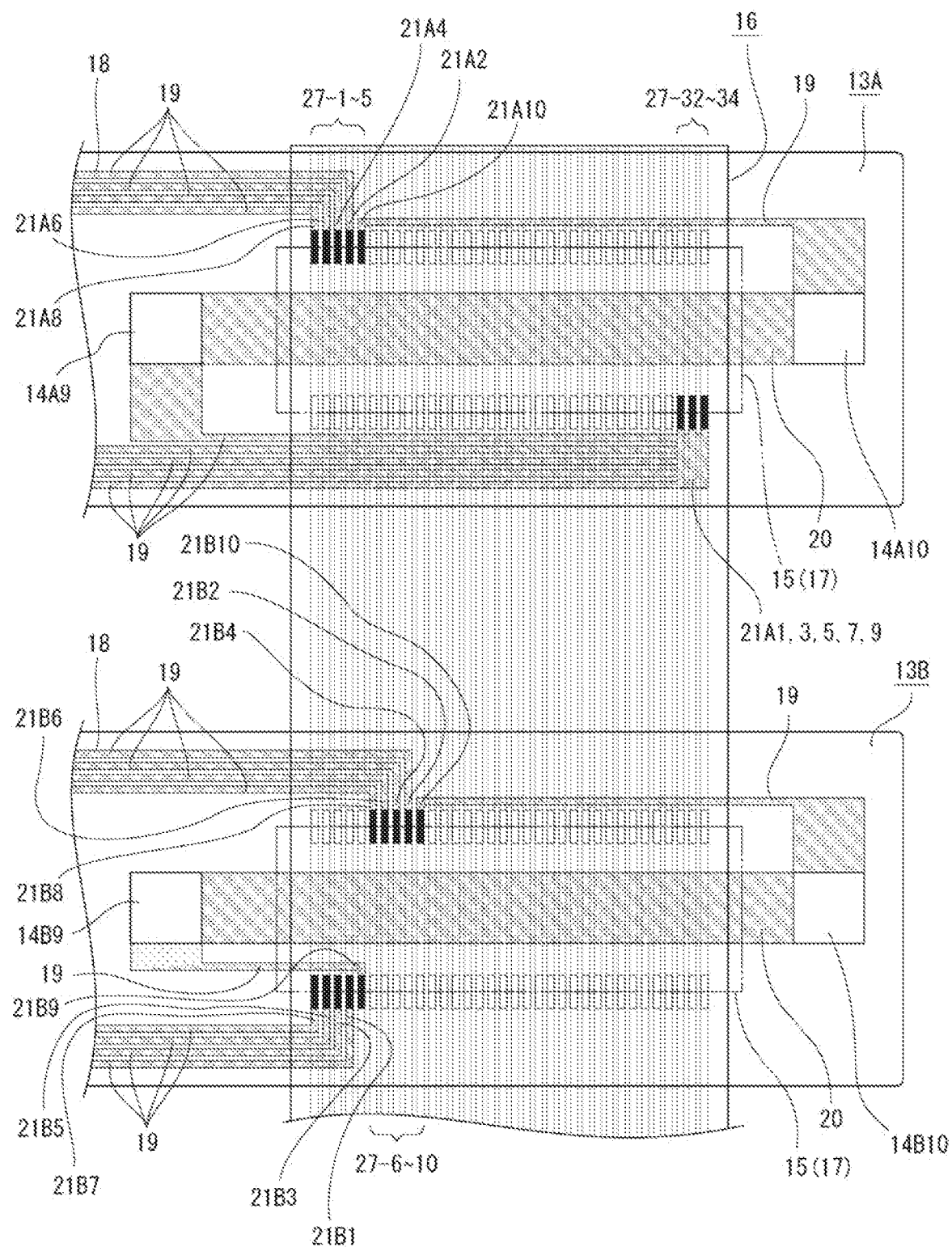
FIG. 17 is an enlarged front view conceptually showing connections between the light source boards and the flexible flat cable.

Note that FIG. 17 is a conceptual diagram of a portion including the light-emitting elements 14A9, 14A10, 14B9, and 14B10 of the light source board 13A and the light source board 13B. FIG. 18 is a conceptual diagram of a portion including the light-emitting elements 14C9, 14C10, 14D9, and 14D10 of the light source board 13C and the light source board 13D. FIG. 19 is a conceptual diagram of a portion including the light-emitting elements 14E9, 14E10, 14F9, and 14F10 of the light source board 13E and the light source board 13F.

The first wires 19 formed on the light source boards 13 are electrically connected to the conductors 27 of the flexible flat cable 16 via the electrodes 25 of the board-side connectors 15 and the connection terminals 29 of the cable-side connectors 17.

In the first wires 19, 19, . . . formed on the upper edge portion of the light source board 13A, as shown in FIG. 17, for example, the connection 21A8 is electrically connected to the conductor 27-1, the connection 21A6 to the conductor 27-2, the connection 21A4 to the conductor 27-3, the connection 21A2 to the conductor 27-4, and the connection 21A10 to the conductor 27-5. Furthermore, in the first wires 19, 19, . . . formed on the lower edge portion of the light source board 13A, for example, the united connections 21A1, 21A3, 21A5, 21A7, and 21A9 are electrically connected to the conductors 27-32, 27-33, and 27-34.

In the first wires 19, 19, . . . formed on the upper edge portion of the light source board 13B, for example, the connection 21B8 is electrically connected to the conductor 27-6, the connection 21B6 to the conductor 27-7, the connection 21B4 to the conductor 27-8, the connection 21B2 to the conductor 27-9, and the connection 21B10 to the conductor 27-10. Furthermore, in the first wires 19, 19, . . . formed on the lower edge portion of the light source board 13B, for example, the connection 21B7 is electrically connected to the conductor 27-1, the connection 21B5 to the conductor 27-2, the connection 21B3 to the conductor 27-3, the connection 21B1 to the conductor 27-4, and the connection 21B9 to the conductor 27-5.

Thus, in the second example, the connection 21A8 and the connection 21B7 are both electrically connected to the conductor 27-1, the connection 21A6 and the connection 21B5 are both electrically connected to the conductor 27-2, the connection 21A4 and the connection 21B3 are both electrically connected to the conductor 27-3, the connection 21A2 and the connection 21B1 are both electrically connected to the conductor 27-4, and the connection 21A10 and the connection 21B9 are both electrically connected to the conductor 27-5.

Consequently, the light-emitting element 14A8 and the light-emitting element 14B7 are connected in series via the conductor 27-1, the light-emitting element 14A6 and the light-emitting element 14B5 are connected in series via the conductor 27-2, the light-emitting element 14A4 and the light-emitting element 14B3 are connected in series via the conductor 27-3, the light-emitting element 14A2 and the light-emitting element 14B1 are connected in series via the conductor 27-4, and the light-emitting element 14A10 and the light-emitting element 14B9 are connected in series via the conductor 27-5.

Furthermore, in the lighting device 50, since the pairs of the adjacent light-emitting elements 14 and 14 are connected in series by the second wires 20, sets of four light-emitting elements 14, 14, . . . are connected in series in each set. Specifically, the light-emitting element 14A1, the light-emitting element 14A2, the light-emitting element 14B1, and the light-emitting element 14B2 are connected in series, the light-emitting element 14A3, the light-emitting element 14A4, the light-emitting element 1433, and the light-emitting element 14B4 are connected in series, the light-emitting element 14A5, the light-emitting element 14A6, the light-emitting element 14B5, and the light-emitting element 14B6 are connected in series, the light-emitting element 14A7, the light-emitting element 14A8, the light-emitting element 14B7, and the light-emitting element 14B8 are connected in series, and the light-emitting element 14A9, the light-emitting element 14A10, the light-emitting element 14139, and the light-emitting element 14B10 are connected in series.

Figure 18:
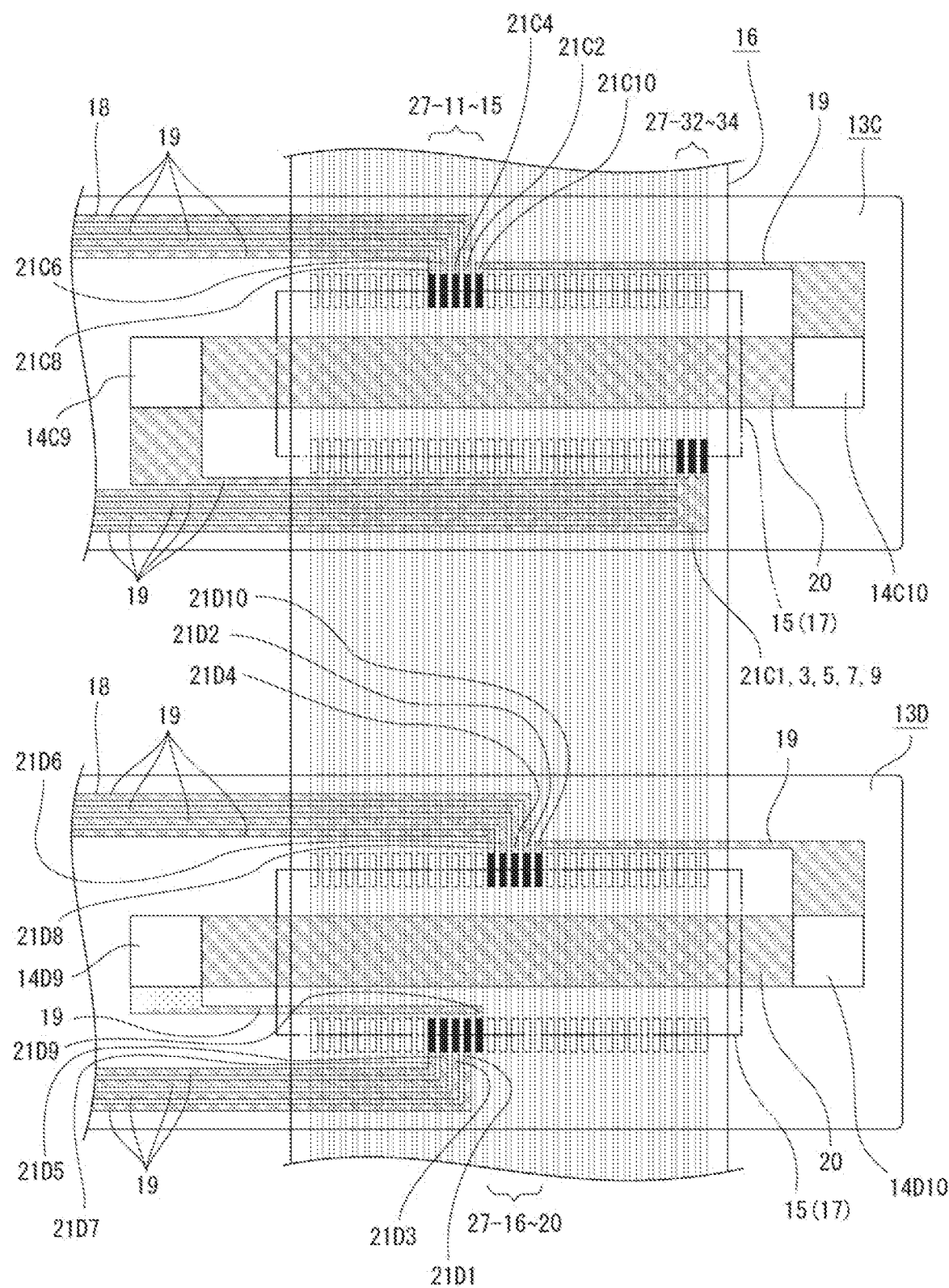
FIG. 18 is an enlarged front view conceptually showing connections between other light source boards and the flexible flat cable.

In the first wires 19, 19, . . . formed on the upper edge portion of the light source board 13C, as shown in FIG. 18, for example, the connection 21C8 is electrically connected to the conductor 27-11, the connection 2106 to the conductor 27-12, the connection 21C4 to the conductor 27-13, the connection 21C2 to the conductor 27-14, and the connection 21C10 to the conductor 27-15. Furthermore, in the first wires 19, 19, . . . formed on the lower edge portion of the light source board 13C, for example, the united connections 21C1, 21C3, 2105, 21C7, and 21C9 are electrically connected to the conductors 27-32, 27-33, and 27-34.

In the first wires 19, 19, . . . formed on the upper edge portion of the light source board 13D, for example, the connection 21D8 is electrically connected to the conductor 27-16, the connection 21D6 to the conductor 27-17, the connection 21D4 to the conductor 27-18, the connection 21D2 to the conductor 27-19, and the connection 21D10 to the conductor 27-20. Furthermore, in the first wires 19, 19, . . . formed on the lower edge portion of the light source board 13D, for example, the connection 21D7 is electrically connected to the conductor 27-11, the connection 21D5 to the conductor 27-12, the connection 21D3 to the conductor 27-13, the connection 21D1 to the conductor 27-14, and the connection 21D9 to the conductor 27-15.

Consequently, in the light-emitting elements 14, 14, . . . disposed on each of the light source board 13C and the light source board 13D, the light-emitting element 1401, the light-emitting element 1402, the light-emitting element 14D1, and the light-emitting element 14D2 are connected in series, the light-emitting element 1403, the light-emitting element 1404, the light-emitting element 14D3, and the light-emitting element 14D4 are connected in series, the light-emitting element 1405, the light-emitting element 1406, the light-emitting element 14D5, and the light-emitting element 14D6 are connected in series, the light-emitting element 1407, the light-emitting element 1408, the light-emitting element 14D7, and the light-emitting element 14D8 are connected in series, and the light-emitting element 1409, the light-emitting element 14010, the light-emitting element 14D9, and the light-emitting element 14D10 are connected in series.

Figure 19:
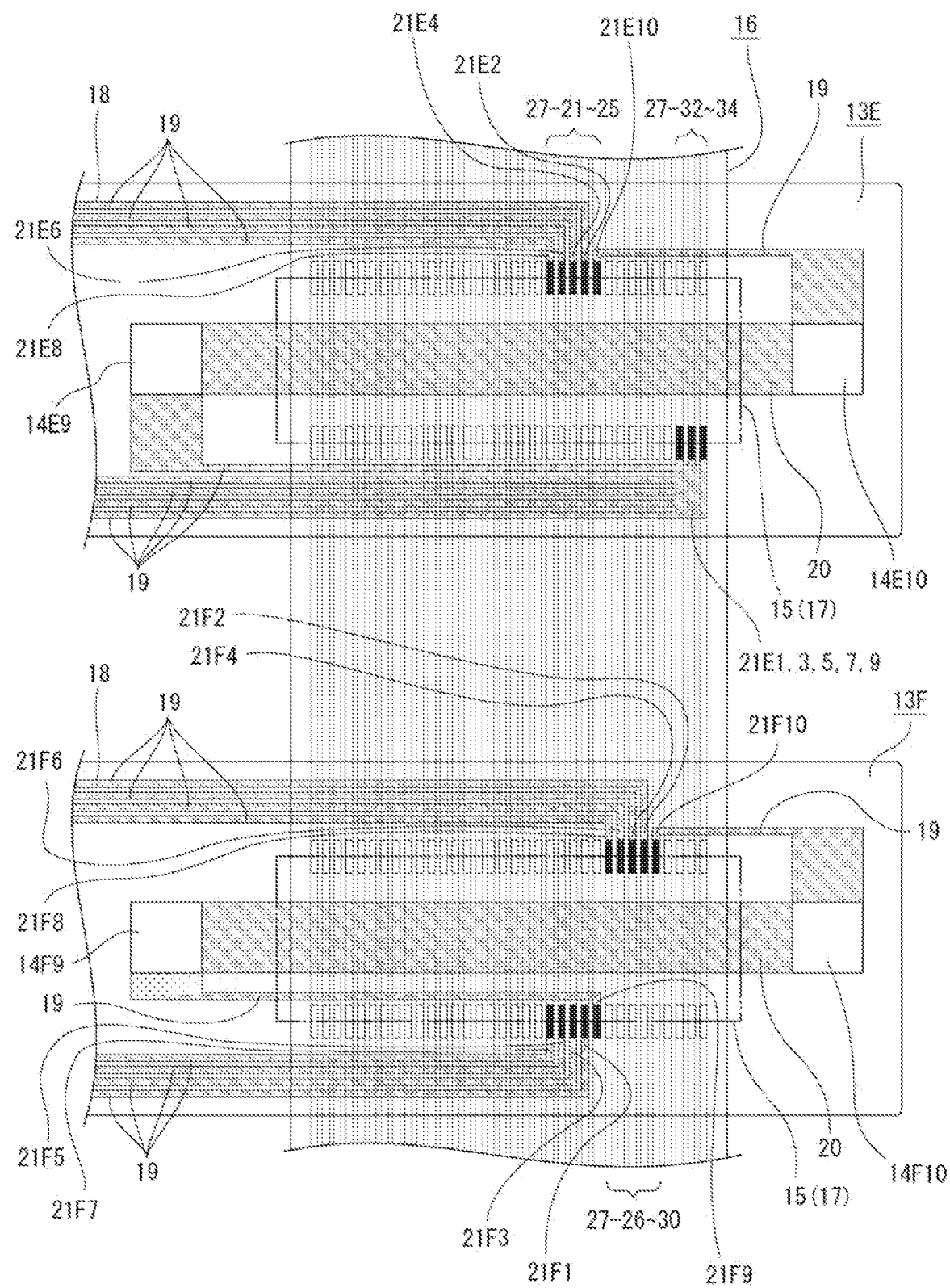
FIG. 19 is an enlarged front view conceptually showing connections between still other light source boards and the flexible flat cable.

In the first wires 19, 19, . . . formed on the upper edge portion of the light source board 13E, as shown in FIG. 19, for example, the connection 21E8 is electrically connected to the conductor 27-21, the connection 21E6 to the conductor 27-22, the connection 21E4 to the conductor 27-23, the connection 21E2 to the conductor 27-24, and the connection 21E10 to the conductor 27-25. Furthermore, in the first wires 19, 19, . . . formed on the lower edge portion of the light source board 13E, for example, the united connections 21E1, 21E3, 21E5, 21E7, and 21E9 are electrically connected to the conductors 27-32, 27-33, and 27-34.

In the first wires 19, 19, . . . formed on the upper edge portion of the light source board 13F, for example, the connection 21F8 is electrically connected to the conductor 27-26, the connection 21F6 to the conductor 27-27, the connection 21F4 to the conductor 27-28, the connection 21F2 to the conductor 27-29, and the connection 21F10 to the conductor 27-30. Furthermore, in the first wires 19, 19, . . . formed on the lower edge portion of the light source board 13F, for example, the connection 21F7 is electrically connected to the conductor 27-21, the connection 21F5 to the conductor 27-22, the connection 21F3 to the conductor 27-23, the connection 21F1 to the conductor 27-24, and the connection 21F9 to the conductor 27-25.

Consequently, in the light-emitting elements 14, 14, . . . disposed on each of the light source board 13E and the light source board 13F, the light-emitting element 14E1, the light-emitting element 14E2, the light-emitting element 14F1, and the light-emitting element 14F2 are connected in series, the light-emitting element 14E3, the light-emitting element 14E4, the light-emitting element 14F3, and the light-emitting element 14F4 are connected in series, the light-emitting element 14E5, the light-emitting element 14E6, the light-emitting element 14F5, and the light-emitting element 14F6 are connected in series, the light-emitting element 14E7, the light-emitting element 14E8, the light-emitting element 14F7, and the light-emitting element 14F8 are connected in series, and the light-emitting element 14E9, the light-emitting element 14E10, the light-emitting element 14F9, and the light-emitting element 14F10 are connected in series.

Thus, also in the second example, as in the first example, the pairs of the light-emitting elements 14, 14, . . . disposed on each of the different light source boards 13 and 13 are connected in series via the board-side connectors 15, the cable-side connectors 17, and the flexible flat cable 16.

Consequently, the light-emitting elements 14, 14, . . . disposed on each of the different light source boards 13 and 13 are simultaneously switched on and off, thus allowing improvement in the degree of freedom in control over the light-emitting elements 14, 14, . . . disposed on each of the light source boards 13, 13, . . . .

In addition, since the sets of the four light-emitting elements 14, 14, . . . adjacent to each other up and down and left and right are connected in series in each set, the positions of these four light-emitting elements 14, 14, . . . are in a positional relationship close to the form of one pixel.

Therefore, it is particularly useful in local dimming, and can significantly improve the contrast of an image displayed on the screen and can reduce the power consumption in the lighting device 50.

Note that in the second example described above, the example in which the four light-emitting elements 14, 14, . . . adjacent to each other up and down and left and right are connected in series with each other has been described, but the number of the light-emitting elements 14 connected in series is not limited to four and may be any number, and further, the light-emitting elements 14, 14, . . . connected in series may be the light-emitting elements 14, 14, . . . disposed at whatever positions. Furthermore, in the display device 1, the light-emitting elements 14, 14, . . . may not be connected in series, and all the light-emitting elements 14, 14, . . . may be individually switched on and off.

Furthermore, in the second example, the light source boards 13, 13, . . . have the different respective wiring patterns 18, 18, . . . , and at least one of the first wires 19, 19, . . . of each of the light source boards 13, 13, . . . having the different wiring patterns 18, 18, . . . is connected to different conductors 27, 27, . . . .

Thus, due to the differences in the wiring patterns 18, the first wires 19 are connected to the different conductors 27 to provide connection between the conductors 27 and the first wires 19 and insulation between the conductors 27 and the wires. Consequently, it becomes possible to use the plurality of board-side connectors 15, 15, . . . and cable-side connectors 17, 17, . . . of the same structures, individually, allowing a reduction in the manufacturing cost of the lighting device 50.

SUMMARY

As described above, in the display device 1 and the lighting device 50, at each of the light source boards 13, 13, ..., some conductors 27, 27, ... of the plurality of conductors 27, 27, ... are electrically connected to the first wires 19, 19, ... of the light source board 13 via the cable-side connector 17 and the board-side connector 15.

Thus, some conductors 27, 27, ... of the plurality of conductors 27, 27, ... in the flexible flat cable 16 connected to the control board 5 are electrically connected to the first wires 19, 19, ... at each of the light source board 13, 13, ... via the cable-side connector 17 and the board-side connector 15. Consequently, the plurality of light source boards 13, 13, ... is connected to the control board 5 via the flexible flat cable 16.

Thus, in the display device 1 and the lighting device 50, the light source boards 13, 13, ... are connected to the control board 5 by the flexible flat cables 16 having a high degree of flexibility. Therefore, even in a case where the light source boards 13, 13, ... or the control board 5 expands or contracts due to temperature changes, causing a misalignment between them, the flexible flat cables 16 sufficiently absorb the misalignment, ensuring good connections at connection portions from the light source board 13, 13, ... to the control board 5.

Furthermore, since some conductors 27, 27, ... of the plurality of conductors 27, 27, ... are connected to the first wires 19, 19, ... at each of the light source boards 13, 13, ..., the required number of the flexible flat cables 16 is reduced, and the flexible flat cables 16 are thin and inexpensive connection means, contributing to reductions in size and manufacturing cost of the display device 1 and the lighting device 50.

This ensures good connections between the light source boards 13, 13, ... and the control board 5 in the display device 1 and the lighting device 50 without causing a rise in manufacturing cost.

Moreover, since the plurality of light source boards 13, 13, ... is connected to the control board 5 via the flexible flat cables 16, switching on/off control over the light-emitting elements 14, 14, ... can be performed in addition to achieving reductions in size and manufacturing cost of the display device 1 and the lighting device 50.

Further, since the plurality of light source boards 13, 13, ... is connected to the flexible flat cables 16 via the board-side connectors 15, 15, ... and the cable-side connectors 17, 17, ..., the lighting device 50 can be easily assembled and electrical connections between the light source boards 13, 13, ... can be facilitated without increasing the number of parts.

Furthermore, the plurality of light source boards 13, 13, ... is spaced in the direction orthogonal to the longitudinal direction, the plurality of light-emitting elements 14, 14, ... is spaced in the longitudinal direction of the light source boards 13, 13, ..., and the plurality of cable-side connectors 17, 17, ... is coupled to the board-side connectors 15, 15, ... attached to the corresponding light source boards 13, 13, ....

Consequently, the plurality of light source boards 13, 13, ... and the flexible flat cables 16 are disposed at right angles, so that space savings can be provided for an arrangement space of the plurality of light source boards 13, 13, ... and the flexible flat cables 16.

<Another Shape of Flexible Flat Cables>

Figure 20:
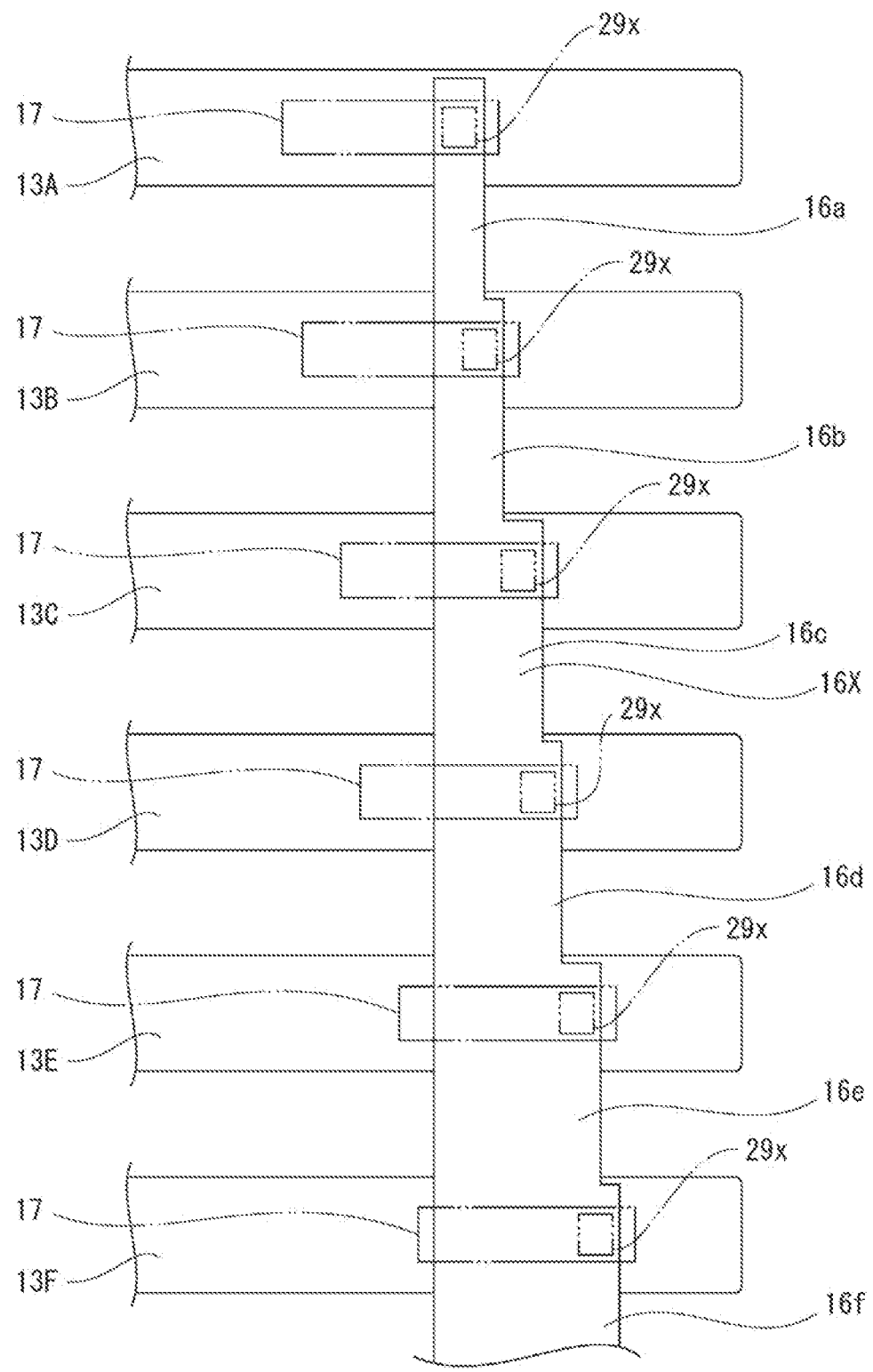
FIG. 20 is a conceptual diagram showing an example of another shape of the flexible flat cable.

A flexible flat cable 16X that is an example of a shape different from that of the flexible flat cable 16 will be described below (see FIG. 20).

The flexible flat cable 16X is connected to the plurality of light source boards 13, 13, ... via the cable-side connectors 17, 17, ... and the board-side connectors 15, 15, ....

The flexible flat cable 16X is formed in a sheet shape, and is formed in a staircase shape with the left-right width changing in the longitudinal direction. The flexible flat cable 16X includes different-width portions 16a, 16b, ..., 16f having different left-right widths according to the number of the light source boards 13, 13, ... to be connected.

The numbers of the conductors 27, 27, ... formed in the different-width portions 16a, 16b, ..., 16f depend on the left-right widths. The number of the conductors 27, 27, ... formed in the different-width portion 16a of the narrowest width is the smallest, and the number of the conductors 27, 27, ... formed in the different-width portion 16f of the widest width is the largest.

In such a flexible flat cable 16X, the number of the conductors 27, 27, ... electrically connectable to the first wires 19, 19, ... of the light source boards 13 increases as the left-right width becomes wider in the different-width portions 16a, 16b, ..., 16f.

In the lighting device 50, as described above, the conductors 27, 27, ... electrically connected to each of the light source boards 13, 13, ... are partially different, so that smaller numbers of the conductors 27, 27, ... need to be positioned for the light source boards 13 located farther from the control board 5. For example, in the example of FIG. 19 described above, the number of the conductors 27 required for the light source board 13E is eight in total, the five conductors 27-21 to 25 and the three conductors 27-32 to 34. The number of the conductors 27 required for the light source board 13F is thirteen in total, the five conductors 27-21 to 25, the five conductors 27-26 to 30, and the three conductors 27-32 to 34 at portions connected to the control board 5. Therefore, in this example, the required number of the conductors 27, 27, ... positioned for each light source board 13 located farther from the control board 5 is fewer by five.

On the basis of such a configuration, the flexible flat cable 16X has smaller numbers of the conductors 27, 27, ... at portions located for the light source boards 13, 13, ... located farther from the control board 5, and is reduced in the left-right width accordingly. The number of the conductors 27, 27, ... formed in the different-width portion 16a located farthest from the control board 5 is the smallest, and the number of the conductors 27, 27, ... formed in the different-width portion 16f located closest to the control board 5 is the largest.

Therefore, using the flexible flat cable 16X ensures efficient connections with the light source boards 13, 13, ..., and allows a reduction in the size of the flexible flat cable.

Furthermore, also in the flexible flat cable 16X, some of the conductors 27, 27, ... are electrically connected to the cable-side connectors 17, 17, ..., individually. Therefore, each of the cable-side connectors 17, 17, ... may be provided with the same number of the connection terminals 29, 29, ... as the number of the conductors 27, 27, ... electrically connected thereto. In this case, as shown in FIG. 20, by changing the attachment positions of the cable-side connectors 17, 17, ... in the left-right direction at each of the different-width portions 16a, 16b, ..., 16f, the connection terminals 29, 29, ... can be electrically connected regardless of the position of connection with the conductors 27, 27, ... in each of the different-width portions 16a, 16b, ..., 16f. FIG. 20 shows an example of the position of connection between the conductors 27, 27, ... in each of the different-width portions 16a, 16b, ..., 16f and the connection terminals 29, 29, ... as connection positions 29x, 29x, .... Thus, in this example, the connection terminals 29, 29, . . . are provided only at the connection position 29x of each cable-side connector 17.

In a case of using the flexible flat cable 16X in this way, the same cable-side connectors 17, 17, . . . can be used by changing the attachment positions of the cable-side connectors 17, 17, . . . in the left-right direction at each of the different-width portions 16a, 16b, . . . , 16f. Consequently, it is not necessary to form different cable-side connectors 17, 17, . . . according to the positions of connection with the conductors 27, 27, . . . , and the manufacturing cost of the lighting device 50 can be reduced.

Note that even in a case of using the flexible flat cable 16X, the cable-side connectors 17 provided with as many connection terminals 29, 29, . . . as all the conductors 27, 27, . . . (see FIG. 5) may be used. In this case as well, the same cable-side connectors 17, 17, . . . can be used.

Note that the flexible flat cable 16X can be used in a curved state in the width direction, and further can be used in a curved state in the thickness direction.

<Others>

Next, other structures of light source boards will be described (see FIGS. 21 to 25). Note that in the drawings referred to for the other structures of the light source boards described below, the light source boards and the light-emitting elements are shown in a simplified manner for ease of explanation.

Figure 21:
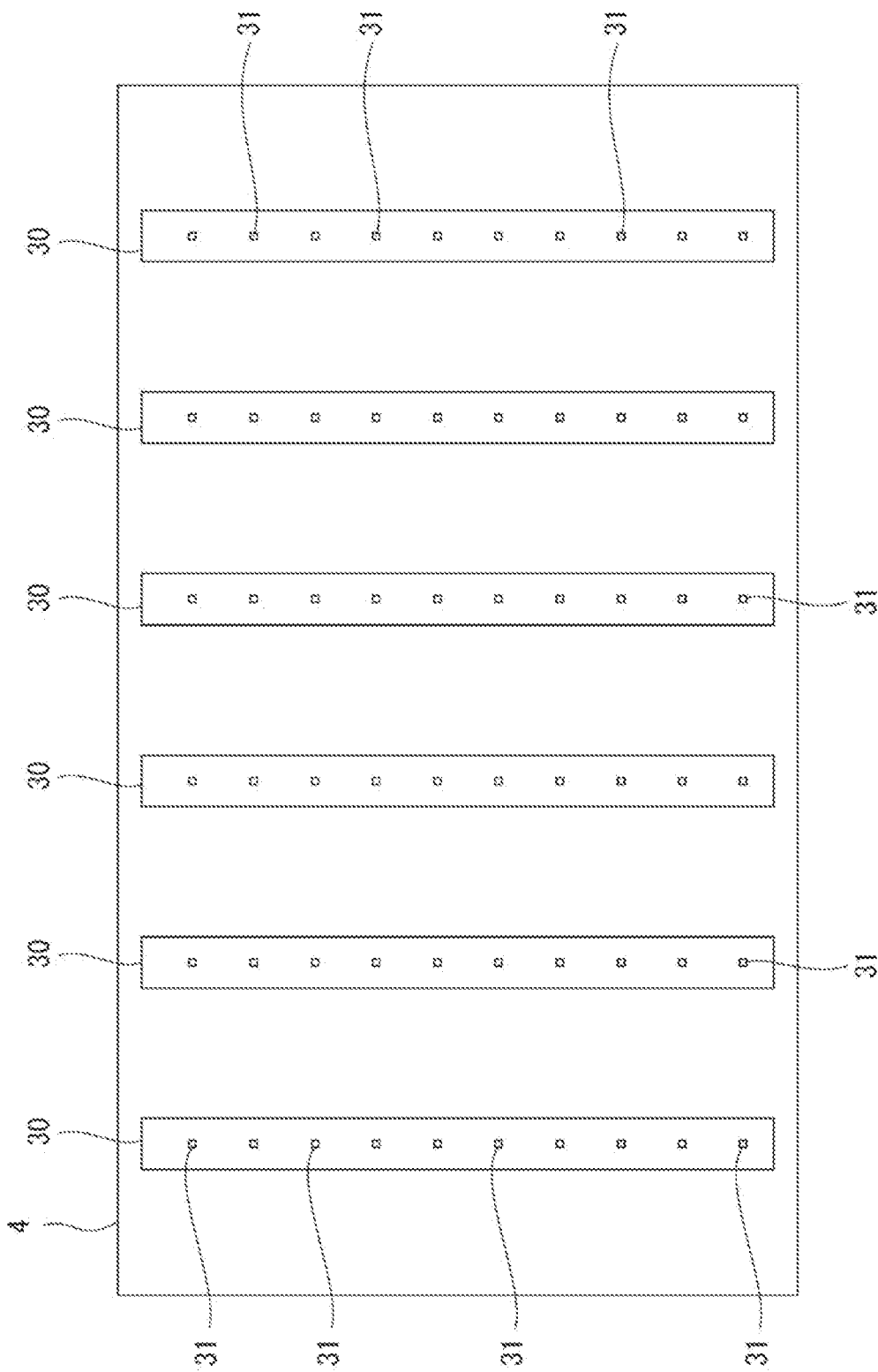
FIG. 21 shows another structure of light source boards together with FIGS. 22 to 25, and this figure is a front view showing a state in which the light source boards are mounted on the back chassis.

Light source boards 30, 30, . . . are mounted on the back chassis 4, spaced left and right, with the longitudinal direction set, for example, in the up-down direction (see FIG. 21). Light-emitting elements 31, 31, . . . are evenly spaced up and down on the light source boards 30.

Figure 22:
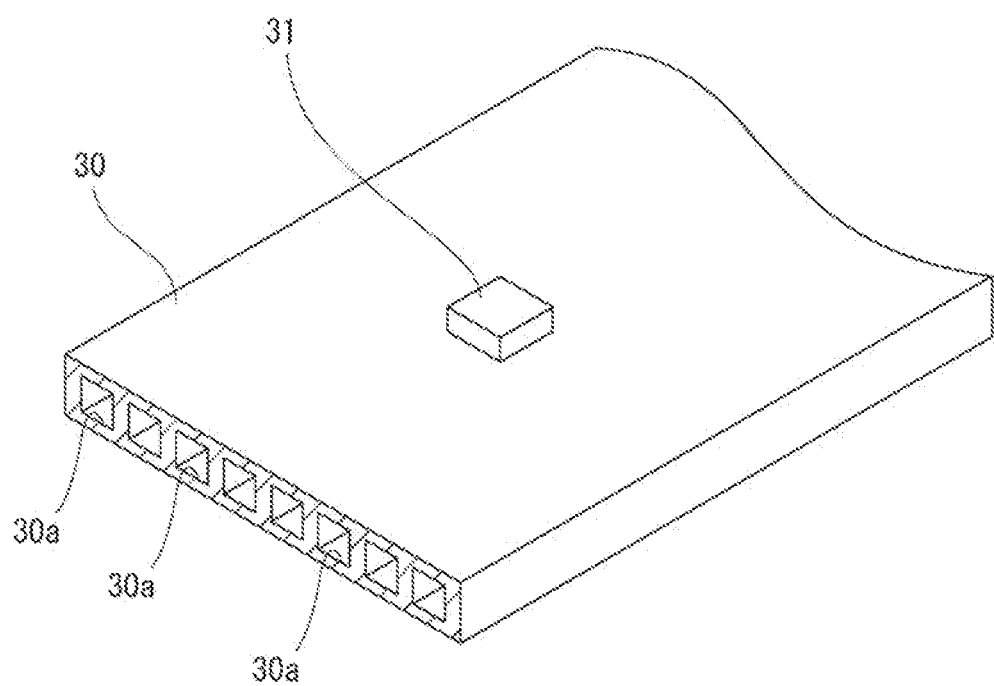
FIG. 22 is a perspective view of the light source board partly shown in cross section.
Figure 23:
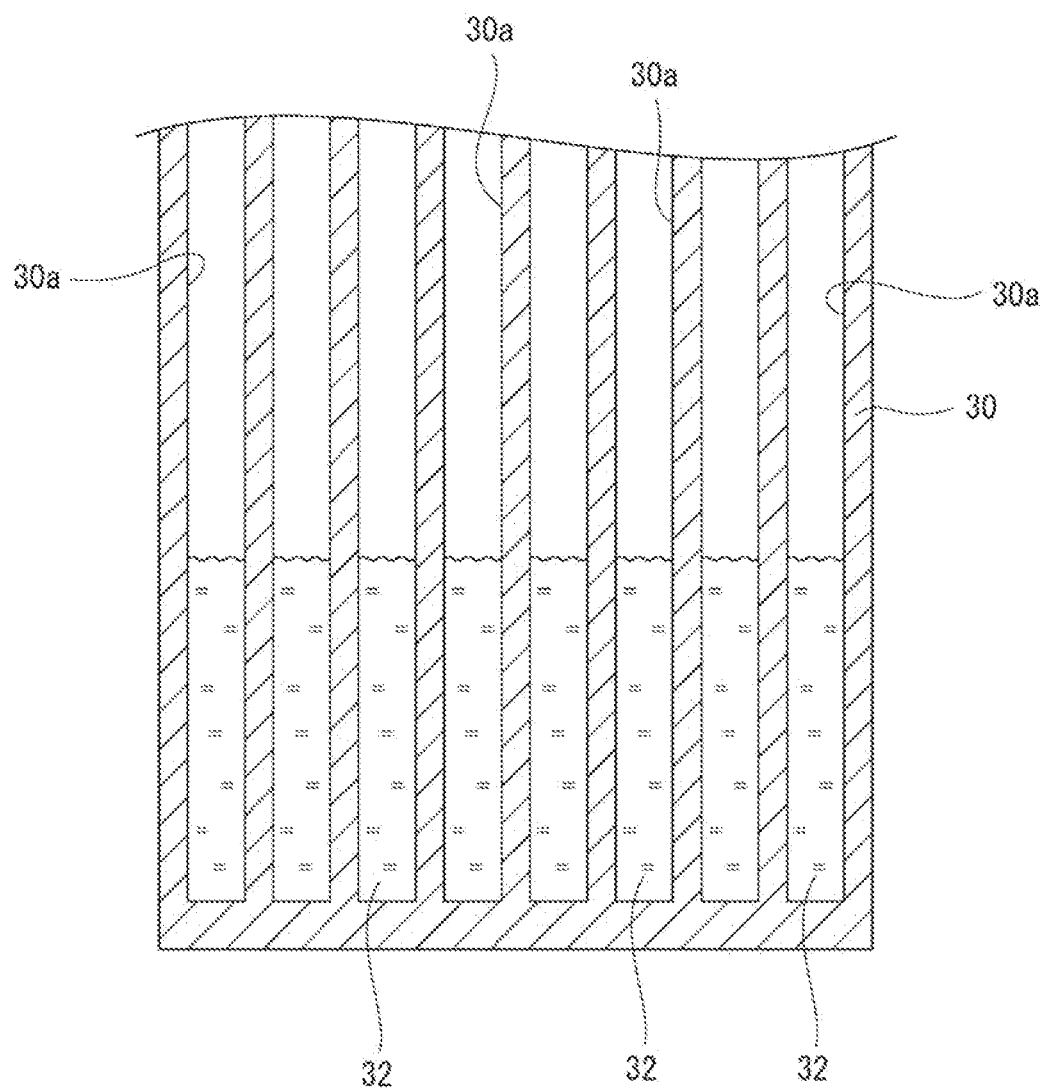
FIG. 23 is a cross-sectional view showing working fluid sealed in the light source board, and others.

Inside each light source board 30, fluid spaces 30a, 30a, . . . extending up and down are formed at intervals left and right (see FIG. 22). The fluid spaces 30a are formed, for example, from a position near the upper end to a position near the lower end of the light source board 30.

Working fluid 32, 32, . . . is sealed in the individual fluid spaces 30a, 30a, . . . (see FIG. 23). The working fluid 32 has a property of changing from liquid to gas when the temperature rises to a certain temperature, and changing from gas to liquid when the temperature drops to the certain temperature. The working fluid 32 is not sealed in the entire fluid spaces 30a, but is sealed in by an amount corresponding to a part of the volume of each fluid space 30a. Consequently, the working fluid 32 is sealed in a lower end portion of each fluid space 30a by gravity in a liquid state.

When light is emitted from the light-emitting elements 31, 31, . . . , the light-emitting elements 31, 31, . . . and the light source boards 30, 30, . . . generate heat. With this heat generation, the temperatures of the light-emitting elements 31, 31, . . . , the light source boards 30, 30, . . . , and the working fluid 32, 32, . . . are raised. When the temperature of the working fluid 32 is raised, the working fluid 32 is changed from liquid to gas, and the working fluid 32 changed to gas flows upward in the fluid spaces 30a.

By the working fluid 32 flowing upward in the fluid spaces 30a, the light source boards 30 and the light-emitting elements 31, 31, . . . are cooled by the working fluid 32.

Consequently, the temperature rise of the light-emitting elements 31, 31, . . . can be reduced, ensuring a stable drive state of the light-emitting elements 31, 31, . . . .

Furthermore, the heat in the light-emitting elements 31, 31, . . . is dispersed, so that the light-emitting elements 31, 31, . . . can be driven with a large amount of power, and the light-emitting elements 31, 31, . . . can be improved in drive efficiency and extended in life, and the display device 1 and the lighting device 50 can be designed at low cost.

Moreover, since the working fluid 32, 32, . . . that functions as coolant for cooling the light-emitting elements 31, 31, . . . and others is sealed in each light source board 30, it is not necessary to provide a structure for cooling the light-emitting elements 31, 31, . . . and others at the outside of the light source board 30. Thus, in addition to ensuring reductions in manufacturing cost and size of the display device 1 and the lighting device 50, the light-emitting elements 31, 31, . . . can be improved in drive efficiency and extended in life.

Figure 24:
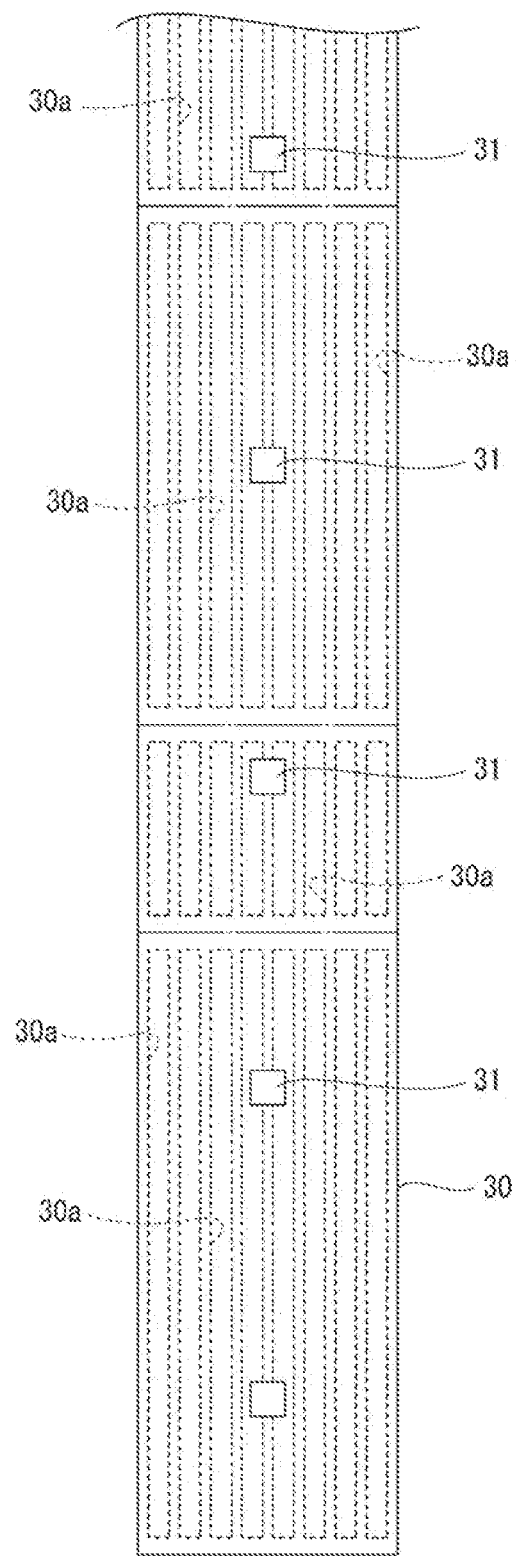
FIG. 24 is a front view showing an example in which fluid spaces are formed separately in an up-down direction of the light source board.

Note that although the above has described the example in which the fluid spaces 30a are formed from the position near the upper end to the position near the lower end of the light source board 30, fluid spaces 30a, 30a, . . . may be formed separately in the up-down direction of the light source board 30, for example (see FIG. 24). In this case, it is desirable that one fluid space 30a is formed at a position corresponding to at least one light-emitting element 31.

By the fluid spaces 30a, 30a, . . . being formed separately in the up-down direction in this way, the respective flow lengths of the working fluid 32, 32, . . . evaporated by a temperature rise are shortened, so that the light-emitting elements 31, 31, . . . and others can be cooled quickly and efficiently.

Figure 25:
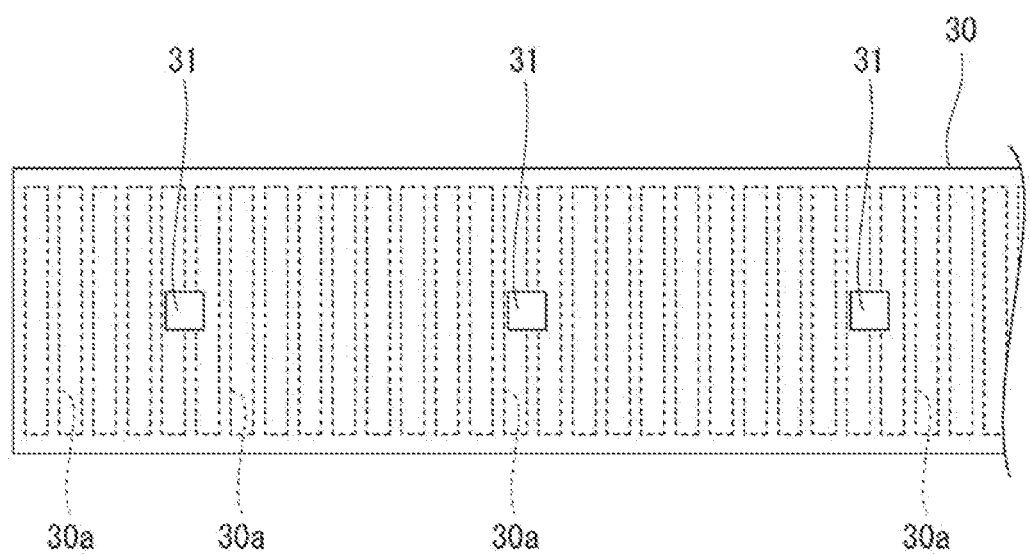
FIG. 25 is a front view showing an example in which the fluid spaces extending up and down are formed in a case where the light source board is mounted on the back chassis in a horizontally long state.

Furthermore, in a case where the light source boards 30, 30, . . . are mounted on the back chassis 4 in a horizontally long state, fluid spaces 30a, 30a, . . . extending up and down may be formed at intervals left and right (see FIG. 25).

In this case as well, the respective flow lengths of the working fluid 32, 32, . . . evaporated by a temperature rise are shortened, so that the light-emitting elements 31, 31, . . . and others can be cooled quickly and efficiently.

Note that the structure in which the light source boards 30 are mounted on the back chassis 4 in the horizontally long state and the fluid spaces 30a, 30a, . . . extending up and down are formed at intervals left and right may be applied to the structure of the above-described light source boards 30.

<The Present Technology>

The present technology can have the following configurations.

(1)

A lighting device including:

a plurality of light source boards each having a wiring pattern including a plurality of wires;

a plurality of light-emitting elements disposed on each light source board, switching on and off of which being controlled by a control board;

board-side connectors each attached to a corresponding one of the plurality of light source boards;

a flexible flat cable that has a multi-core structure including a flat-shaped insulator and a plurality of conductors aligned in a direction orthogonal to a thickness direction of the insulator, and is connected at one end to the control board; and a plurality of cable-side connectors attached to the flexible flat cable and coupled to the board-side connectors, in which some conductors of the plurality of conductors are electrically connected to the wires at each of the plurality of light source boards via a corresponding one of the cable-side connectors and a corresponding one of the board-side connectors.

(2)

The lighting device according to (1) above, in which the light source boards are each formed in a shape having a longitudinal direction, and are spaced in a direction orthogonal to the longitudinal direction, the light-emitting elements are spaced in the longitudinal direction of the light source boards, and the plurality of cable-side connectors is coupled to the board-side connectors each attached to the corresponding one of the plurality of light source boards.

(3)

The lighting device according to (1) or (2) above, in which at least two of the light-emitting elements disposed on different corresponding ones of the light source boards are connected in series via the board-side connectors, the cable-side connectors, and the flexible flat cable.

(4)

The lighting device according to any one of (1) to (3) above, in which each cable-side connector is provided with a plurality of connection terminals, connection holes for exposing some conductors of the plurality of conductors are formed in the insulator, and some connection terminals of the plurality of connection terminals are inserted into the connection holes to be connected to the conductors.

(5)

The lighting device according to any one of (1) to (3) above, in which each cable-side connector is provided with a plurality of connection terminals each connected to a corresponding one of the plurality of conductors, and each board-side connector is provided with at least one electrode connected to some connection terminals of the plurality of connection terminals.

(6)

The lighting device according to any one of (1) to (3) above, in which the wiring patterns of the plurality of light source boards are different, and at least one of the wires of each of the light source boards having the different wiring patterns is connected to a different corresponding one of the conductors.

(7)

The lighting device according to any one of (1) to (6) above, in which the flexible flat cable includes a plurality of different-width portions that is formed in a staircase shape whose width changes in a longitudinal direction and becomes wider toward the control board in the longitudinal direction, each of the cable-side connectors is attached to a corresponding one of the plurality of different-width portions, and the numbers of the conductors in the different-width portions of larger widths are larger.

(8)

The lighting device according to (7) above, in which each of the cable-side connectors of the same configuration is attached to the corresponding one of the plurality of different-width portions.

(9)

A display device including:

a display that displays an image on a display surface;

a back chassis disposed on a side opposite the display surface of the display; and a lighting device disposed between the display and the back chassis to function as a backlight, the lighting device including:

a plurality of light source boards each having a wiring pattern including a plurality of wires;

a plurality of light-emitting elements disposed on each light source board, switching on and off of which being controlled by a control board;

board-side connectors each attached to a corresponding one of the plurality of light source boards;

a flexible flat cable that has a multi-core structure including a flat-shaped insulator and a plurality of conductors aligned in a direction orthogonal to a thickness direction of the insulator, and is connected at one end to the control board; and a plurality of cable-side connectors attached to the flexible flat cable and coupled to the board-side connectors, in which some conductors of the plurality of conductors are electrically connected to the wires at each of the plurality of light source boards via a corresponding one of the cable-side connectors and a corresponding one of the board-side connectors.

REFERENCE SIGNS LIST

1 Display device
4 Back chassis
6 Control board
7 Display
7a Display surface
13 Light source board
14 Light-emitting element
15 Board-side connector
16 Flexible flat cable
17 Cable-side connector
18 Wiring pattern
19 First wire
20 Second wire
25 Electrode
26 Insulator
26a Connection hole
27 Conductor
29 Connection terminal
50 Lighting device

The invention claimed is:

1. A display device comprising:

a casing; and a lighting device in the casing, wherein the lighting device comprising:

a plurality of light source boards each having a wiring pattern including a plurality of wires;

a plurality of light-emitting elements disposed on each light source board which are controlled by a control board that controls switching between on and off of the light-emitting elements;

board-side connectors each attached to a corresponding one of the plurality of light source boards;

a flexible flat cable that has a multi-core structure including a flat-shaped insulator and a plurality of conductors aligned in a direction orthogonal to a thickness direction of the insulator, and is connected at one end to the control board; and a plurality of cable-side connectors connected to the flexible flat cable and connected to the board-side connectors, wherein some conductors of the plurality of conductors are electrically connected to the wires at each of the plurality of light source boards via a corresponding one of the cable-side connectors and a corresponding one of the board-side connectors, wherein
each cable-side connector is provided with a plurality of connection terminals, connection holes for exposing some conductors of the plurality of conductors are formed in the insulator, and
some connection terminals of the plurality of connection terminals are inserted into the connection holes to be connected to the conductors.

2. The display device according to claim 1, wherein the casing comprises:
a bezel on a front side; and
a back chassis on a backside.

3. The display device according to claim 2, wherein the back chassis has a cable insertion hole for the flexible flat cable.

4. The display device according to claim 2, further comprising a panel disposed in the bezel.

5. The display device according to claim 4, wherein the panel comprises a reflective sheet disposed between diffuser plate and the back chassis.

6. The display device according to claim 5, wherein the lighting device disposed between the diffuser plate and the back chassis.

7. A display device comprising:
a casing; and
a lighting device in the casing,
wherein the lighting device comprising:
a plurality of light source boards each having a wiring pattern including a plurality of wires;
a plurality of light-emitting elements disposed on each light source board which are controlled by a control board that controls switching between on and off of the light-emitting elements;
board-side connectors each attached to a corresponding one of the plurality of light source boards;
a flexible flat cable that has a multi-core structure including a flat-shaped insulator and a plurality of conductors aligned in a direction orthogonal to a thickness direction of the insulator, and is connected at one end to the control board; and
a plurality of cable-side connectors connected to the flexible flat cable and connected to the board-side connectors,
wherein some conductors of the plurality of conductors are electrically connected to the wires at each of the plurality of light source boards via a corresponding one of the cable-side connectors and a corresponding one of the board-side connectors,
wherein the wiring patterns of the plurality of light source boards are different, and at least one of the wires of each of the light source boards having the different wiring patterns is connected to a different corresponding one of the conductors.

8. The display device according to claim 7, wherein the light emitting diodes have lens mounted thereon.

9. The display device according to claim 7, wherein the light emitting diodes are connected in series and configured to support local dimming.

10. The display device according to claim 9, wherein the light-emitting elements are light emitting diodes.

11. The display device according to claim 10, wherein the casing comprises:
a bezel on a front side and a back chassis on a backside.

12. The display device according to claim 11, wherein the back chassis has a cable insertion hole for the flexible flat cable.

13. The display device according to claim 11, further comprising a panel disposed in the bezel.

14. The display device according to claim 13, wherein the panel comprises a reflective sheet disposed between diffuser plate and the back chassis.

15. The display device according to claim 14, wherein the lighting device disposed between the diffuser plate and the back chassis.

16. The display device according to claim 11, wherein the light source boards are mounted on the back chassis.

17. The display device according to claim 16, wherein the light-emitting elements are light emitting diodes.

18. The display device according to claim 17, wherein the light emitting diodes have lens mounted thereon.

19. The display device according to claim 10, wherein the light-emitting elements are light emitting diodes and configured to provide for local dimming.

20. The display device according to claim 19, wherein the light emitting diodes have lens mounted thereon.

* * * * *